(12) United States Patent
Kim et al.

(10) Patent No.: US 12,455,818 B2
(45) Date of Patent: Oct. 28, 2025

(54) NONVOLATILE MEMORY DEVICE INCLUDING MEMORY PLANES, AND STORAGE DEVICE AND UFS DEVICE INCLUDING THE SAME

(71) Applicant: Samsung Electronics Co., Ltd., Suwon-si (KR)

(72) Inventors: Youngkyu Kim, Suwon-si (KR); Chulwon Lee, Suwon-si (KR); Eunho Kim, Suwon-si (KR); Cheolyong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/748,381

(22) Filed: Jun. 20, 2024

(65) Prior Publication Data

US 2025/0225072 A1    Jul. 10, 2025

(30) Foreign Application Priority Data

Jan. 8, 2024    (KR) .................. 10-2024-0002786

(51) Int. Cl.
*G06F 12/02*    (2006.01)
*G11C 29/12*    (2006.01)

(52) U.S. Cl.
CPC .......... *G06F 12/0246* (2013.01); *G11C 29/12* (2013.01)

(58) Field of Classification Search
None
See application file for complete search history.

(56) References Cited

U.S. PATENT DOCUMENTS

| 7,010,736 | B1 | 3/2006 | Teh et al. |
| 9,269,459 | B2 | 2/2016 | Adham et al. |
| 10,134,483 | B2 | 11/2018 | Varadarajan et al. |
| 10,445,230 | B2 | 10/2019 | Liu |
| 2023/0153000 | A1 | 5/2023 | Choi et al. |

FOREIGN PATENT DOCUMENTS

| CN | 103578562 A | 2/2014 |
| KR | 10-2023-0069794 A | 5/2023 |

*Primary Examiner* — Kevin Verbrugge
(74) *Attorney, Agent, or Firm* — Muir Patent Law, PLLC

(57) ABSTRACT

A nonvolatile memory device includes a memory cell array and a control circuit. The memory cell array includes a plurality of memory planes each including memory blocks each of which includes memory cells. The control circuit controls an operation of the memory cell array in units of super blocks. The super blocks include memory blocks included in different memory planes. A first memory block is included in a first super block and a first memory plane, and stores first sensitive data required while operating the nonvolatile memory device. A second memory block is included in the first super block and a second memory plane, and stores replicated data of the first sensitive data. A third memory block is included in the first super block and a third memory plane, and stores second sensitive data required while operating the nonvolatile memory device is operating and obtained during a first manufacturing process.

20 Claims, 25 Drawing Sheets

FIG. 18

| FWSB | CH0 | | | | CH1 | | | |
|---|---|---|---|---|---|---|---|---|
| | W00 | | | | W10 | | | |
| | CHP00 | | | | CHP10 | | | |
| | PL00 | PL01 | PL02 | PL03 | PL10 | PL11 | PL12 | PL13 |
| | FB00 | FB01 | FB02 | FB03 | FB10 | FB11 | FB12 | FB13 |
| | FWD | | mBTD00 | | FWD | | mBTD10 | |

FIG. 19

| FWSB | CH0 | | | | CH1 | | | |
|---|---|---|---|---|---|---|---|---|
| | W00 | | | | W10 | | | |
| | CHP00 | | | | CHP10 | | | |
| | PL00 | PL01 | PL02 | PL03 | PL10 | PL11 | PL12 | PL13 |
| | FB00 | FB01 | FB02 | FB03 | FB10 | FB11 | FB12 | FB13 |
| | FWD | | mBTD00 | | NU | | mBTD10 | |

FIG. 20

| FWSB | CH0 | | | | | | | | | | CH1 | | | | | | | | | |
|---|---|---|---|---|---|---|---|---|---|---|---|---|---|---|---|---|---|---|---|---|
| | W00 | | | | W01 | | | | | | W10 | | | | W11 | | | | | |
| | CHP00 | | | | CHP01 | | | | CHP01' | | | CHP10 | | | | CHP11 | | | CHP11' | |
| | PL00 | PL01 | PL02 | PL03 | PL00' | PL01' | PL02' | PL03' | PL10 | PL11 | PL12 | PL13 | PL10' | PL11' | PL12' | PL13' |
| | FB00 | FB01 | FB02 | FB03 | FB00' | FB01' | FB02' | FB03' | FB10 | FB11 | FB12 | FB13 | FB10' | FB11' | FB12' | FB13' |
| | FWD | | mBTD00 | | NU | | mBTD01 | | FWD | | mBTD10 | | NU | | mBTD11 | |

FIG. 21

| FWSB | CH0 | | | | | | | | | CH1 | | | | | | | | |
|---|---|---|---|---|---|---|---|---|---|---|---|---|---|---|---|---|---|---|
| | W00 | | | | W01 | | | | | W10 | | | | W11 | | | | |
| | CHP00 | | | | CHP01 | | | | | CHP10 | | | | CHP11 | | | | |
| | PL00 | PL01 | PL02 | PL03 | PL00' | PL01' | PL02' | PL03' | | PL10 | PL11 | PL12 | PL13 | PL10' | PL11' | PL12' | PL13' |
| | FB00 | FB01 | FB02 | FB03 | FB00' | FB01' | FB02' | FB03' | | FB10 | FB11 | FB12 | FB13 | FB10' | FB11' | FB12' | FB13' |
| | FWD | FWD | mBTD00 | | NU | | mBTD01 | | | NU | | mBTD10 | | NU | | mBTD11 | |

FIG. 22

| FWSB | CH0 | | | | CH1 | | | | CH2 | | | | CH3 | | | |
|---|---|---|---|---|---|---|---|---|---|---|---|---|---|---|---|---|
| | W00 | | | | W10 | | | | W20 | | | | W30 | | | |
| | CHP00 | | | | CHP10 | | | | CHP20 | | | | CHP30 | | | |
| | PL00 | PL01 | PL02 | PL03 | PL10 | PL11 | PL12 | PL13 | PL20 | PL21 | PL22 | PL23 | PL30 | PL31 | PL32 | PL33 |
| | FB00 | FB01 | FB02 | FB03 | FB10 | FB11 | FB12 | FB13 | FB20 | FB21 | FB22 | FB23 | FB30 | FB31 | FB32 | FB33 |
| | FWD | | mBTD00 | | FWD | | mBTD10 | | NU | | mBTD20 | | NU | | mBTD30 | |

FIG. 23

| FWSB | CHP00 | | | | CHP10 | | | | CHP20 | | | | CHP30 | | | |
|---|---|---|---|---|---|---|---|---|---|---|---|---|---|---|---|---|
| | W00 | | | | W10 | | | | W20 | | | | W30 | | | |
| | CH0 | | | | CH1 | | | | CH2 | | | | CH3 | | | |
| | PL00 | PL01 | PL02 | PL03 | PL10 | PL11 | PL12 | PL13 | PL20 | PL21 | PL22 | PL23 | PL30 | PL31 | PL32 | PL33 |
| | FB00 | FB01 | FB02 | FB03 | FB10 | FB11 | FB12 | FB13 | FB20 | FB21 | FB22 | FB23 | FB30 | FB31 | FB32 | FB33 |
| | FWD | | mBTD00 | | FWD | | mBTD10 | | FWD | | mBTD20 | | NU | | mBTD30 | |

FIG. 24

| FWSB | CH0 | | | | CH1 | | | | CH2 | | | | CH3 | | | |
|---|---|---|---|---|---|---|---|---|---|---|---|---|---|---|---|---|
| | W00 | | | | W10 | | | | W20 | | | | W30 | | | |
| | CHP00 | | | | CHP10 | | | | CHP20 | | | | CHP30 | | | |
| | PL00 | PL01 | PL02 | PL03 | PL10 | PL11 | PL12 | PL13 | PL20 | PL21 | PL22 | PL23 | PL30 | PL31 | PL32 | PL33 |
| | FB00 | FB01 | FB02 | FB03 | FB10 | FB11 | FB12 | FB13 | FB20 | FB21 | FB22 | FB23 | FB30 | FB31 | FB32 | FB33 |
| | FWD | | mBTD00 | | FWD | | mBTD10 | | FWD | | mBTD20 | | FWD | | mBTD30 | |

NONVOLATILE MEMORY DEVICE INCLUDING MEMORY PLANES, AND STORAGE DEVICE AND UFS DEVICE INCLUDING THE SAME

CROSS-REFERENCE TO RELATED APPLICATION(S)

This application claims priority under 35 USC § 119 to Korean Patent Application No. 10-2024-0002786 filed on Jan. 8, 2024 in the Korean Intellectual Property Office (KIPO), the contents of which are herein incorporated by reference in their entirety.

BACKGROUND

1. Technical Field

Example embodiments relate generally to semiconductor integrated circuits, and more particularly to nonvolatile memory devices including memory planes, and storage devices and universal flash storage (UFS) devices including the nonvolatile memory devices.

2. Description of the Related Art

Semiconductor memory devices include volatile and nonvolatile memory devices. Volatile memory devices lose stored data when disconnected from power, and nonvolatile memory devices retain stored data when disconnected from power. Volatile memory devices may perform read and write operations at a higher speed than nonvolatile memory devices. Nonvolatile memory devices may be used to store data that needs be retained regardless of whether power is provided.

One or more nonvolatile memory devices may be used in data storage devices. Examples of such data storage devices include universal flash storage (UFS) devices. These types of data storage devices may have various design and/or performance advantages. Examples of potential advantages include the absence of moving mechanical parts, higher data access speeds, stability, durability, and/or low power consumption. A UFS interface defined by the joint electron device engineering council (JEDEC) standard may support a higher operating speed than a conventional storage device.

In general, the importance of built-in self-test (BIST) of the nonvolatile memory device is increasing. As the capacitance of the nonvolatile memory device increases, an overhead may occur in order for the nonvolatile memory device to perform a self-test and analyze a test result thereof. In order to realize miniaturization, weight reduction, high performance, large capacity, and high reliability of nonvolatile memory devices, research and development of nonvolatile memory devices are continuously being conducted.

SUMMARY

At least one example embodiment of the present disclosure provides a nonvolatile memory device that operates with a plurality of memory planes (or mats) and is capable of efficiently managing sensitive data or critical data.

At least one example embodiment of the present disclosure provides a storage device and a UFS device that include the nonvolatile memory device.

According to example embodiments, a nonvolatile memory device includes a memory cell array and a control circuit. The memory cell array includes a plurality of memory planes. Each of the plurality of memory planes includes memory blocks. Each of the memory blocks includes memory cells. The control circuit controls an operation of the memory cell array in units of super blocks. The super blocks include memory blocks included in different memory planes. A first memory block is included in a first super block of the super blocks and a first memory plane of the plurality of memory planes, and stores first sensitive data that is required while the nonvolatile memory device is operating. A second memory block is included in the first super block and a second memory plane of the plurality of memory planes different from the first memory plane, and stores replicated data identical to the first sensitive data. A third memory block is included in the first super block and a third memory plane of the plurality of memory planes different from the first and second memory planes, and stores second sensitive data that is required while the nonvolatile memory device is operating and is obtained during a first manufacturing process for the nonvolatile memory device.

According to example embodiments, a storage device includes a plurality of nonvolatile memory devices and a storage controller that controls an operation of the plurality of nonvolatile memory devices. A first nonvolatile memory device of the plurality of nonvolatile memory devices is connected to the storage controller through a first channel, and includes a first memory cell array and a first control circuit. The first memory cell array includes a plurality of first memory planes. Each of the plurality of first memory planes includes memory blocks each of which includes memory cells. The first control circuit controls an operation of the first memory cell array in units of super blocks. The super blocks include memory blocks included in different memory planes. A first-first memory block is included in a first super block of the super blocks and a first-first memory plane among the plurality of first memory planes, and stores first sensitive data that is required while the storage device is operating. A first-second memory block is included in the first super block and a first-second memory plane different from the first-first memory plane among the plurality of first memory planes, and stores replicated data identical to the first sensitive data. A first-third memory block is included in the first super block and a first-third memory plane different from the first-first and first-second memory planes among the plurality of first memory planes, and stores first-second sensitive data that is required while the first nonvolatile memory device is operating and is obtained during a first manufacturing process for the first nonvolatile memory device.

According to example embodiments, a universal flash storage (UFS) device includes a UFS controller, a first nonvolatile memory device, a second nonvolatile memory device, a third nonvolatile memory device and a fourth nonvolatile memory device. The first nonvolatile memory device is connected to the UFS controller through a first channel, includes first-first, first-second, first-third and first-fourth memory planes each of which including memory blocks, and operates in units of super blocks. The super blocks include memory blocks included in different memory planes. The second nonvolatile memory device is connected to the UFS controller through a second channel, includes second-first, second-second, second-third and second-fourth memory planes each of which including memory blocks, and operates in units of super blocks. The third nonvolatile memory device is connected to the UFS controller through a third channel, includes third-first, third-second, third-third and third-fourth memory planes each of which including memory blocks, and operates in units of super blocks. The fourth nonvolatile memory device is connected to the UFS controller through a fourth channel, includes fourth-first, fourth-second, fourth-third and fourth-fourth memory planes each of which including memory blocks, and operates in units of super blocks. First-first and first-second memory blocks are included in a first super block of the super blocks and the first-first and first-second memory planes, respectively, and store firmware data that is required while the UFS device is operating. First-third and first-fourth memory blocks are included in the first super block and the first-third and first-fourth memory planes, respectively, and store first result data of a built-in self-test (BIST) operation in a packaging process that is performed while the first nonvolatile memory device is manufacturing. Second-first and second-second memory blocks are included in a second super block of the super blocks and the second-first and second-second memory planes, respectively, and are configured to store the firmware data. Second-third and second-fourth memory blocks are included in the second super block and the second-third and second-fourth memory planes, respectively, and store second result data of the BIST operation in the packaging process that is performed while the second nonvolatile memory device is manufacturing. Third-first and third-second memory blocks are included in a third super block of the super blocks and the third-first and third-second memory planes, respectively, and do not store the firmware data. Third-third and third-fourth memory blocks are included in the third super block and the third-third and third-fourth memory planes, respectively, and store third result data of the BIST operation in the packaging process that is performed while the third nonvolatile memory device is manufacturing. Fourth-first and fourth-second memory blocks are included in a fourth super block of the super blocks and the fourth-first and fourth-second memory planes, respectively, and do not store the firmware data. Fourth-third and fourth-fourth memory blocks are included in the fourth super block and the fourth-third and fourth-fourth memory planes, respectively, and store fourth result data of the BIST operation in the packaging process that is performed while the fourth nonvolatile memory device is manufacturing.

In the nonvolatile memory device, the storage device and the UFS device according to example embodiments, the EDS data may be stored in the OTP block, and the BIST data (or mBIST data) may be stored in the unused memory blocks, which occur as the number of memory planes increases. Accordingly, both the EDS data and the BIST data may be efficiently managed by additionally setting only the OTP block for the EDS data and by storing the BIST data using an existing unused memory block. As a result, the integrity of the EDS data may be guaranteed or ensured, the program/erase operations may be performed when the rework operation is performed on the BIST data, and thus the deterioration of performance of the nonvolatile memory device may be prevented.

BRIEF DESCRIPTION OF THE DRAWINGS

Illustrative, non-limiting example embodiments will be more clearly understood from the following detailed description taken in conjunction with the accompanying drawings.

FIGS. 18, 19, 20, 21, 22, 23 and 24 are diagrams for describing an operation of a storage device according to example embodiments.

DETAILED DESCRIPTION OF THE EMBODIMENTS

Figure 1:
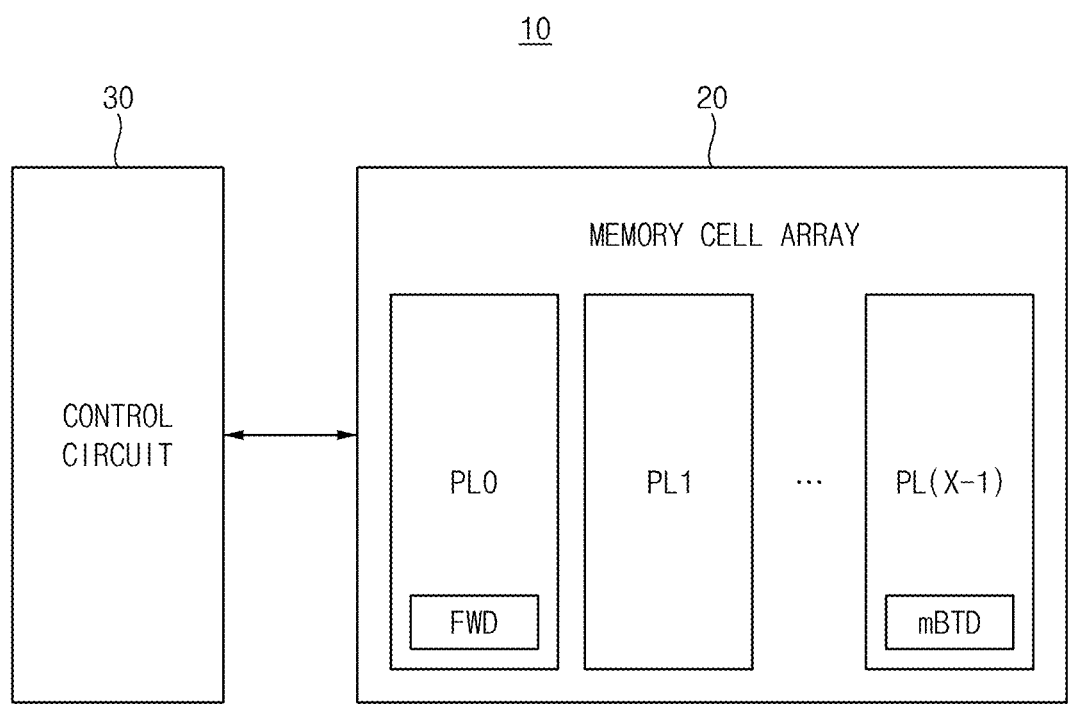
FIG. 1 is a block diagram illustrating a nonvolatile memory device according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating a nonvolatile memory device according to example embodiments.

Referring to FIG. 1, a nonvolatile memory device 10 includes a memory cell array 20 and a control circuit 30.

The memory cell array 20 includes a plurality of memory cells, a plurality of memory blocks and a plurality of memory planes PL0 to PL(X−1), where X is a positive integer greater than or equal to two.

Each of the plurality of memory planes PL0 to PL(X−1) includes memory blocks, and each of the plurality of memory blocks includes memory cells. For example, a memory block may represent a set of memory cells that serve as units of erase operations, and may be referred to simply as a block. For example, a memory plane is a set of memory blocks that share bitlines and a well, and may be referred to as a mat or simply as a plane.

In addition, each of the plurality of memory blocks may include pages, and each page may include memory cells. For example, a page may be a set of memory cells that serve as units of program operations and read operations.

The control circuit 30 controls an operation of the memory cell array 20. For example, the control circuit 30 may control the operation of the memory cell array 20 in units of super blocks (or on a super block basis), and each super block may include memory blocks included in different memory planes. The super block will be described with reference to FIG. 2.

The memory cell array 20 may store first sensitive data FWD and second sensitive data mBTD. The first sensitive data FWD and the second sensitive data mBTD may be stored in different memory planes of the memory cell array 20. For example, the first sensitive data FWD may be stored in the first memory plane PL0, and the second sensitive data mBTD may be stored in the X-th memory plane PL(X−1). However, example embodiments of the invention are not limited thereto. The sensitive data may be referred to as critical data, important data, or the like.

In some example embodiments, the first sensitive data FWD and the second sensitive data mBTD may be stored in different memory planes of the memory cell array 20, and may be stored in the same super block of the memory cell array 20.

In some example embodiments, the first sensitive data FWD and the second sensitive data mBTD may be different types of data, and may be data that are required when or while the nonvolatile memory device 10 is operating. For example, the first sensitive data FWD may be firmware data for driving a storage device including the nonvolatile memory device 10. For example, the second sensitive data mBTD may be data that is obtained during a first manufacturing process for the nonvolatile memory device 10. For example, the first manufacturing process may be a packaging process that is performed while the nonvolatile memory device 10 is manufacturing, and the second sensitive data mBTD may include a result of a built-in self-test (BIST) operation that is performed in the packaging process. In an embodiment, the storage device may include a storage controller and the nonvolatile memory device 10.

Detailed configurations and storage schemes of the first sensitive data FWD and the second sensitive data mBTD will be described with reference to FIGS. 3A, 3B and 4 through 11. A detailed configuration of the nonvolatile memory device 10 will be described with reference to FIGS. 12 through 14.

FIGS. 2, 3A, 3B, 4 and 5 are diagrams for describing an operation and a configuration of a nonvolatile memory device according to example embodiments.

Figure 2:
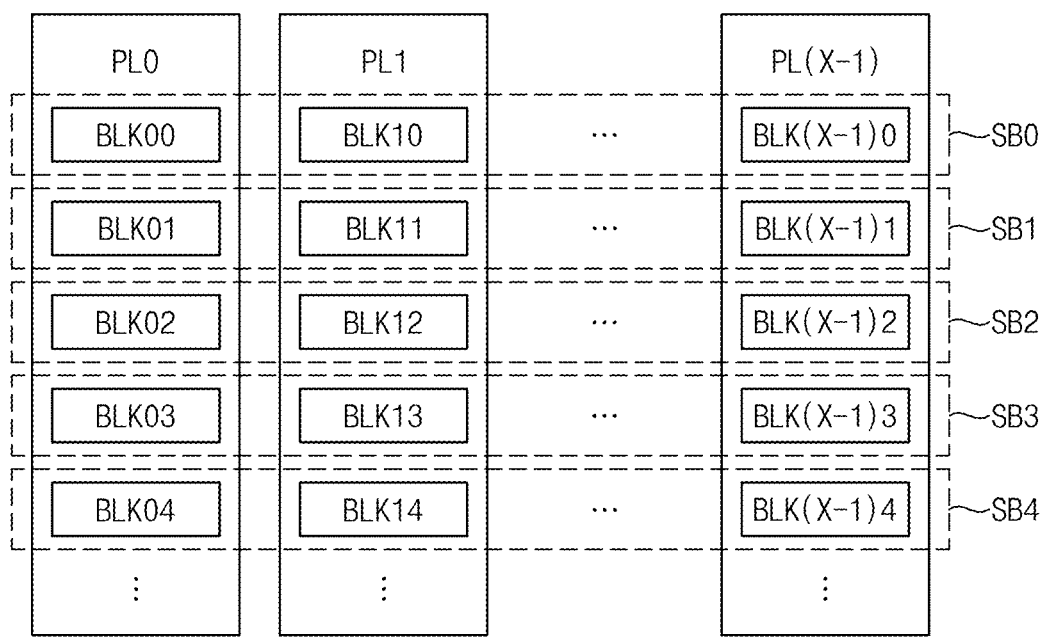
FIGS. 2, 3A, 3B, 4 and 5 are diagrams for describing an operation and a configuration of a nonvolatile memory device according to example embodiments.

Referring to FIG. 2, an example of controlling the plurality of memory planes PL0 to PL(X−1) included in the nonvolatile memory device 10 in units of the super blocks is illustrated.

The first memory plane PL0 may include a first-first memory block BLK00, a first-second memory block BLK01, a first-third memory block BLK02, a first-fourth memory block BLK03, and a first-fifth memory block BLK04. Similarly, the second memory plane PL1 may include a second-first memory block BLK10, a second-second memory block BLK11, a second-third memory block BLK12, a second-fourth memory block BLK13, and a second-fifth memory block BLK14. The X-th memory plane PL(X−1) may include an X-th-first memory block BLK(X−1)0, an X-th-second memory block BLK(X−1)1, an X-th-third memory block BLK(X−1)2, an X-th-fourth memory block BLK(X−1)3, and an X-th-fifth memory block BLK(X−1)4.

Memory blocks included in different memory planes may form one super block. For example, the first-first, second-first and X-th-first memory blocks BLK00, BLK10 and BLK(X−1)0 may form a first super block SB0. The first-second, second-second and X-th-second memory blocks BLK01, BLK11 and BLK(X−1)1 may form a second super block SB1. The first-third, second-third and X-th-third memory blocks BLK02, BLK12 and BLK(X−1)2 may form a third super block SB2. The first-fourth, second-fourth and X-th-fourth memory blocks BLK03, BLK13 and BLK(X−1)3 may form a fourth super block SB3. The first-fifth, second-fifth and X-th-fifth memory blocks BLK04, BLK14 and BLK(X−1)4 may form a fifth super block SB4. In some example embodiments, although not illustrated in FIG. 2, a super block may be formed only for some planes.

The operation of controlling the plurality of memory planes PL0 to PL(X−1) in units of the super blocks may represent or indicate that one super block is accessed simultaneously or concurrently. For example, a program operation, a read operation, an erase operation, etc. may be simultaneously performed on the memory blocks BLK00, BLK10 and BLK(X−1)0 included in the first super block SB0.

Figure 3A:
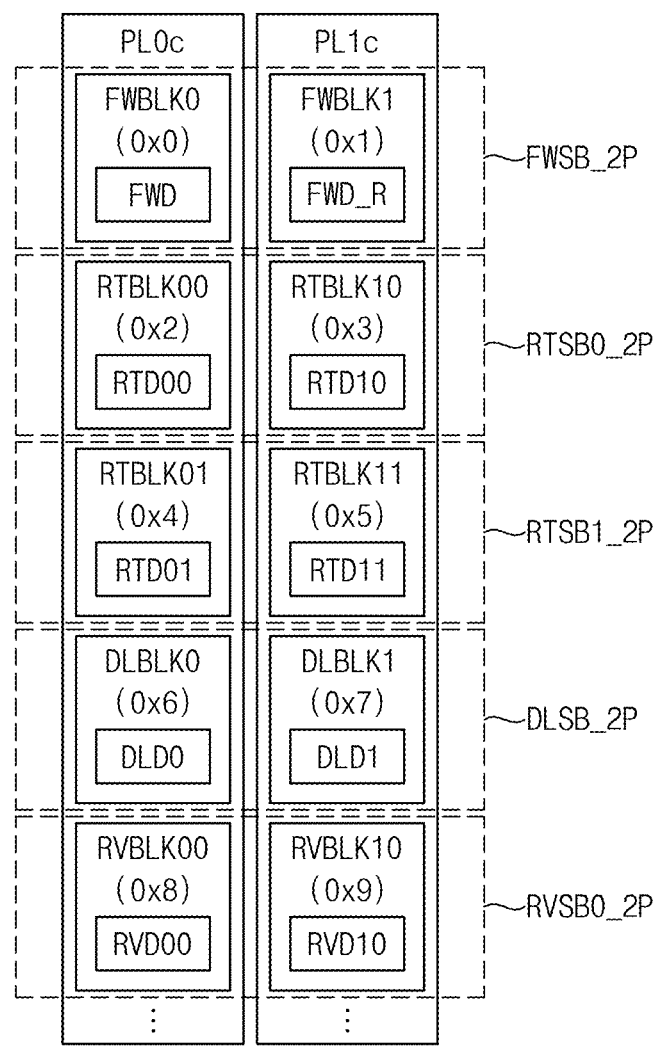

Referring to FIG. 3A, an example of a nonvolatile memory device in which super blocks are set for two memory planes PL0c and PL1c (e.g., in units of two mats) is illustrated.

As with that described with reference to FIG. 2, the first memory plane PL0c may include memory blocks FWBLK0, RTBLK00, RTBLK01, DLBLK0, and RVBLK00, and the second memory plane PL1c may include memory blocks FWBLK1, RTBLK10, RTBLK11, DLBLK1, and RVBLK10. The memory blocks FWBLK0 and FWBLK1 may form a first super block FWSB_2P, the memory blocks RTBLK00 and RTBLK10 may form a second super block RTSB0_2P, the memory blocks RTBLK01 and RTBLK11 may form a third super block RTSB1_2P, the memory blocks DLBLK0 and DLBLK1 may form a fourth super block DLSB_2P, and the memory blocks RVBLK00 and RVBLK10 may form a fifth super block RVSB0_2P.

When the nonvolatile memory device operates in units of the super blocks, addresses of memory blocks may be set in units of the super blocks. For example, addresses of memory blocks may sequentially increase in the same super block, and addresses of memory blocks in a next super block may increase as compared with addresses of memory blocks in a previous super block. For example, addresses of 0x0 and 0x1 may be set for the memory blocks FWBLK0 and FWBLK1, respectively, in the first super block FWSB_2P, addresses of 0x2 and 0x3 may be set for the memory blocks RTBLK00 and RTBLK10, respectively, in the second super block RTSB0_2P, addresses of 0x4 and 0x5 may be set for the memory blocks RTBLK01 and RTBLK11, respectively, in the third super block RTSB1_2P, addresses of 0x6 and 0x7 may be set for the memory blocks DLBLK0 and DLBLK1, respectively, in the fourth super block DLSB_2P, and addresses of 0x8 and 0x9 may be set for the memory blocks RVBLK00 and RVBLK10, respectively, in the fifth super block RVSB0_2P. In other words, addresses of 0x(2K) (K is zero or a positive integer) may be set for the memory blocks FWBLK0, RTBLK00, RTBLK01, DLBLK0 and RVBLK00 in the first memory plane PL0c, and addresses of 0x(2K+1) may be set for the memory blocks FWBLK1, RTBLK10, RTBLK11, DLBLK1 and RVBLK10 in the second memory plane PL1c.

The super blocks FWSB_2P, RTSB0_2P, RTSB1_2P, DLSB_2P and RVSB0_2P illustrated in FIG. 3A may store data associated with or related to operations of the nonvolatile memory device and/or the storage device including the nonvolatile memory device.

For example, the first super block FWSB_2P and the memory blocks FWBLK0 and FWBLK1 may store data associated with firmware for driving the storage device. For example, the memory block FWBLK0 may store firmware data FWD, and the memory block FWBLK1 may store replicated (or duplicated) firmware data FWD_R that is identical to the firmware data FWD. For example, the firmware data FWD may correspond to the first sensitive data FWD in FIG. 1. The first super block FWSB_2P may be referred to as a firmware super block, and the memory blocks FWBLK0 and FWBLK1 may be referred to as firmware memory blocks or master context blocks (MCBs).

In some example embodiments, locations of the memory blocks FWBLK0 and FWBLK1 in which the firmware data FWD and the replicated firmware data FWD_R are stored may be predefined in a specification of the storage device. For example, when the storage device is a universal flash storage (UFS) device, it may be defined in a UFS standard such that the firmware data FWD and the replicated firmware data FWD_R are stored in memory blocks corresponding to addresses of 0x0 and 0x1.

For example, the second and third super blocks RTSB0_2P and RTSB1_2P and the memory blocks RTBLK00, RTBLK10, RTBLK01 and RTBLK11 may store root data RTD00, RTD10, RTD01 and RTD11 for driving the storage device. The super blocks RTSB0_2P and RTSB1_2P may be referred to as root super blocks, and the memory blocks RTBLK00, RTBLK10, RTBLK01 and RTBLK11 may be referred to as root memory blocks.

In some example embodiments, the root data RTD00, RTD10, RTD01 and RTD11 may be data associated with the firmware data FWD, and thus it may be defined in the specification of the storage device such that the root data RTD00, RTD10, RTD01 and RTD11 are stored in correspondence with the firmware data FWD and the replicated firmware data FWD_R (e.g., such that the root data RTD00, RTD10, RTD01 and RTD11 are stored in memory blocks within the same memory plane as the firmware data FWD and the replicated firmware data FWD_R).

For example, the fourth super block DLSB_2P and the memory blocks DLBLK0 and DLBLK1 may store distributed large memory system (DLM) data DLD0 and DLD1 for driving the storage device. The fourth super block DLSB_2P may be referred to as a DLM super block, and the memory blocks DLBLK0 and DLBLK1 may be referred to as DLM memory blocks.

For example, the fifth super block RVSB0_2P and the memory blocks RVBLK00 and RVBLK10 may store reserved data RVD00 and RVD10 for driving the storage device. The fifth super block RVSB0_2P may be referred to as a reserved super block, and the memory blocks RVBLK00 and RVBLK10 may be referred to as reserved memory blocks.

Although not illustrated in FIG. 3A, the nonvolatile memory device may further include several reserved super blocks and several reserve memory blocks for storing the reserved data, and may further include several meta super blocks and several meta memory blocks for storing other meta data, and may further include a plurality of user super blocks and a plurality of user memory blocks for storing user data.

Figure 3B:
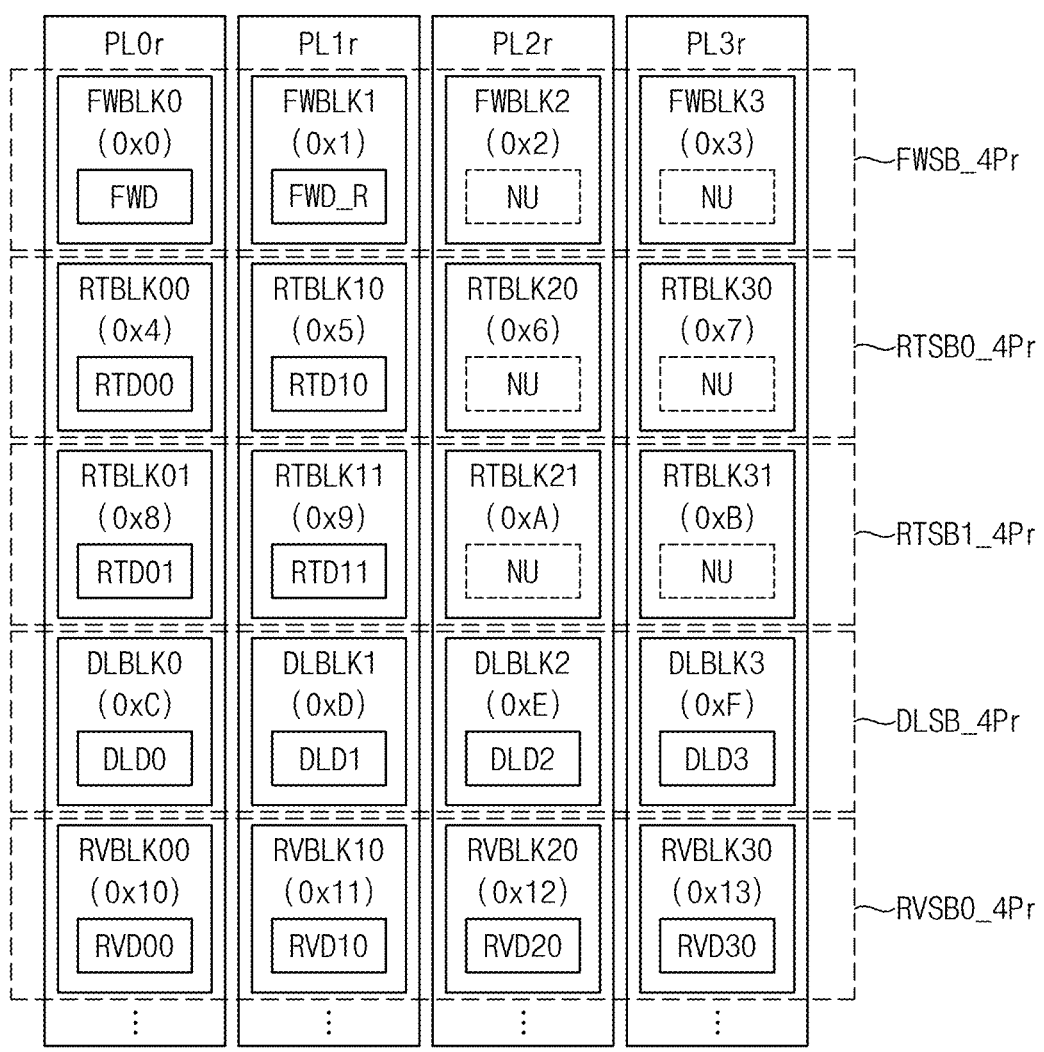

Referring to FIG. 3B, an example of a nonvolatile memory device in which super blocks are set for four memory planes PL0r, PL1r, PL2r and PL3r (e.g., in units of four mats) is illustrated. The descriptions repeated with or overlapping with descriptions of FIG. 3A will be omitted in the interest of brevity.

Configurations of the first and second memory planes PL0r and PL1r may be the same as the configurations of the first and second memory planes PL0c and PL1c in FIG. 3A. The third memory plane PL2r may include memory blocks FWBLK2, RTBLK20, RTBLK21, DLBLK2, and RVBLK20, and the fourth memory plane PL3r may include memory blocks FWBLK3, RTBLK30, RTBLK31, DLBLK3, and RVBLK30. The memory blocks FWBLK0, FWBLK1, FWBLK2 and FWBLK3 may form a first super block FWSB_4Pr, the memory blocks RTBLK00, RTBLK10, RTBLK20 and RTBLK30 may form a second super block RTSB0_4Pr, the memory blocks RTBLK01, RTBLK11, RTBLK21 and RTBLK31 may form a third super block RTSB1_4Pr, the memory blocks DLBLK0, DLBLK1, DLBLK2 and DLBLK3 may form a fourth super block DLSB_4Pr, and the memory blocks RVBLK00, RVBLK10, RVBLK20 and RVBLK30 may form a fifth super block RVSB0_4Pr.

Addresses of 0x0, 0x1, 0x2 and 0x3 may be set for the memory blocks FWBLK0, FWBLK1, FWBLK2 and FWBLK3, respectively, in the first super block FWSB_4Pr, addresses of 0x4, 0x5, 0x6 and 0x7 may be set for the memory blocks RTBLK00, RTBLK10, RTBLK20 and RTBLK30, respectively, in the second super block RTSB0_4Pr, addresses of 0x8, 0x9, 0xA and 0xB may be set for the memory blocks RTBLK01, RTBLK11, RTBLK21 and RTBLK31, respectively, in the third super block RTSB1_4Pr, addresses of 0xC, 0xD, 0xE and 0xF may be set for the memory blocks DLBLK0, DLBLK1, DLBLK2 and DLBLK3, respectively, in the fourth super block DLSB_4Pr, and addresses of 0x10, 0x11, 0x12 and 0x13 may be set for the memory blocks RVBLK00, RVBLK10, RVBLK20 and RVBLK30, respectively, in the fifth super block RVSB0_4Pr. In other words, addresses of 0x(4K) may be set for the memory blocks FWBLK0, RTBLK00, RTBLK01, DLBLK0 and RVBLK00 of the first memory plane PL0r, addresses of 0x(4K+1) may be set for the memory blocks FWBLK1, RTBLK10, RTBLK11, DLBLK1 and RVBLK10 of the second memory plane PL1r, addresses of 0x(4K+2) may be set for the memory blocks FWBLK2, RTBLK20, RTBLK21, DLBLK2 and RVBLK20 of the third memory plane PL2r, and addresses of 0x(4K+3) may be set for the memory blocks FWBLK3, RTBLK30, RTBLK31, DLBLK3 and RVBLK30 of the fourth memory plane PL3r.

As described above, the locations (e.g., the addresses of 0x0 and 0x1) of the memory blocks FWBLK0 and FWBLK1 in which the firmware data FWD and the replicated firmware data FWD_R are stored may be predefined in the specification of the storage device. Therefore, when the super blocks are set on four memory planes PL0r, PL1r, PL2r and PL3r, the memory blocks FWBLK2 and FWBLK3 other than the memory blocks FWBLK0 and FWBLK1 in the first super block FWSB_4Pr may be areas NU that does not store data. In other words, in the specification of the storage device, the memory blocks FWBLK2 and FWBLK3 may be unused and empty areas. For example, the firmware may allocate the memory blocks FWBLK2 and FWBLK3 as areas in which data is not stored. For example, the firmware may allocate the memory blocks FWBLK2 and FWBLK3 as unused areas.

Similarly, it may be defined in the specification of the storage device such that the root data RTD00, RTD10, RTD01 and RTD11 are stored in correspondence with the firmware data FWD and the replicated firmware data FWD_R. Therefore, when the super blocks are set on four memory planes PL0r, PL1r, PL2r and PL3r, the memory blocks RTBLK20, RTBLK30, RTBLK21 and RTBLK31 other than the memory blocks RTBLK00, RTBLK10, RTBLK01 RTBLK11 in the second and third super blocks RTSB0_4Pr and RTSB1_4Pr may be areas NU that does not store data.

When the super blocks are set on four memory planes PL0r, PL1r, PL2r and PL3r, the fourth super block DLSB_4Pr and the memory blocks DLBLK0, DLBLK1, DLBLK2 and DLBLK3 may store DLM data DLD0, DLD1, DLD2 and DLD3, and the fifth super block RVSB0_4Pr and the memory blocks RVBLK00, RVBLK10, RVBLK20 and RVBLK30 may store reserved data RVD00, RVD10, RVD20 and RVD30.

Figure 4:
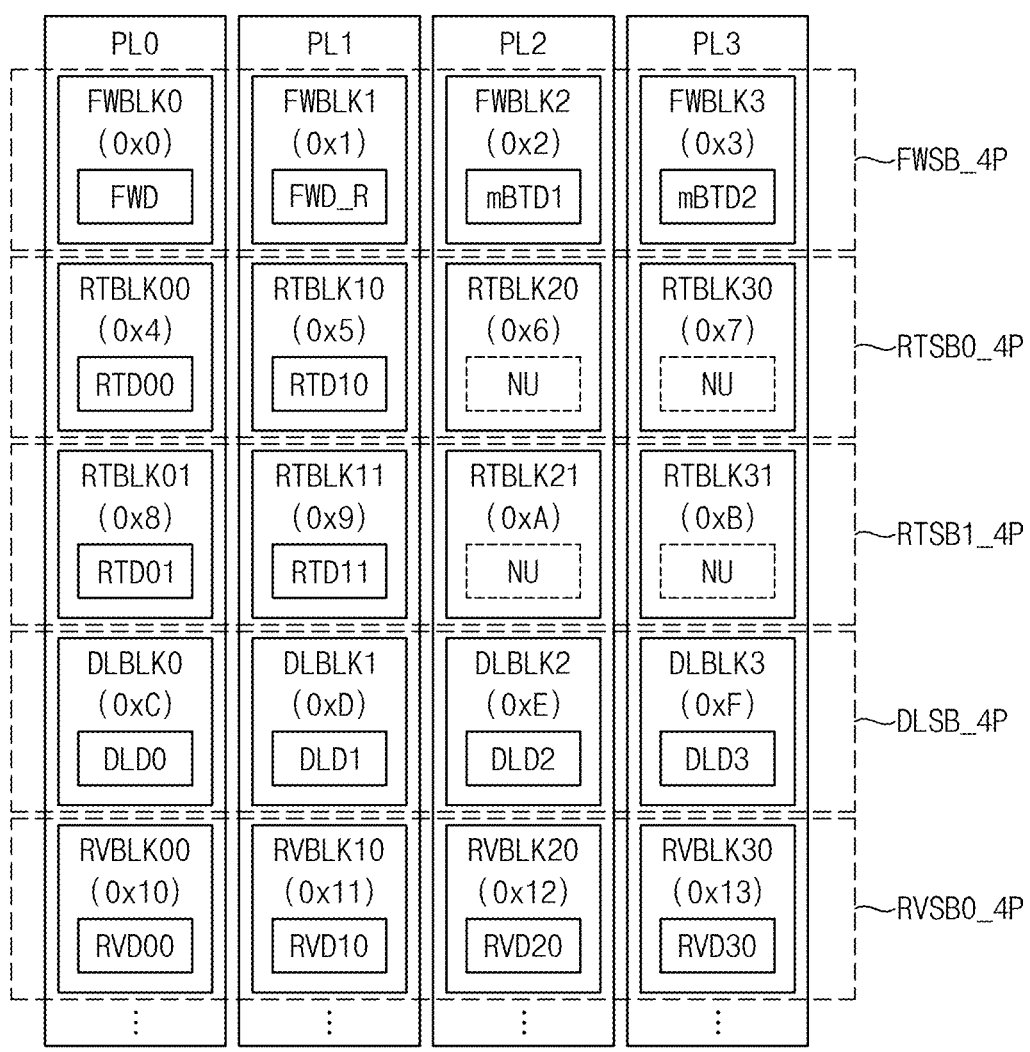

Referring to FIG. 4, when super blocks are set on four memory planes PL0, PL1, PL2 and PL3 in a nonvolatile memory device, an example of storing sensitive data in unused memory blocks according to an example embodiment is illustrated. The descriptions repeated with or overlapping with descriptions of FIGS. 3A and 3B will be omitted in the interest of brevity.

Configurations of the memory planes PL0, PL1, PL2 and PL3 and super blocks FWSB_4P, RTSB0_4P, RTSB1_4P, DLSB_4P and RVSB0_4P may be the same as the configurations of the memory planes PL0r, PL1r, PL2r and PL3r and the super blocks FWSB_4Pr, RTSB0_4Pr, RTSB1_4Pr, DLSB_4Pr and RVSB0_4Pr in FIG. 3B.

Among the memory blocks FWBLK0, FWBLK1, FWBLK2 and FWBLK3 in the first super block FWSB_4P, the memory blocks FWBLK2 and FWBLK3, which are the areas NU that do not store data, may store sensitive data mBTD1 and mBTD2 other than the firmware data FWD and the replicated firmware data FWD_R. For example, the memory block FWBLK2 may store a first portion mBTD1 of the sensitive data mBTD1 and mBTD2, and the memory block FWBLK3 may store a second portion mBTD2 of the sensitive data mBTD1 and mBTD2. For example, the sensitive data mBTD1 and mBTD2 may correspond to the second sensitive data mBTD in FIG. 1. For example, each of the sensitive data mBTD1 and mBTD2 may be the same as each other or different from each other.

Among the memory blocks RTBLK00, RTBLK10, RTBLK20 and RTBLK30 in the second super block RTSB0_4P, the memory blocks RTBLK20 and RTBLK30, which are the areas NU that do not store data, may store sensitive data mBTD3 and mBTD4 other than the firmware data FWD and the replicated firmware data FWD_R. For example, the memory block RTBLK20 may store a third portion mBTD3 of the sensitive data mBTD3 and mBTD4, and the memory block RTBLK30 may store a fourth portion mBTD4 of the sensitive data mBTD3 and mBTD4.

Among the memory blocks RTBLK01, RTBLK11, RTBLK21 and RTBLK31 in the third super block RTSB1_4P, the memory blocks RTBLK21 and RTBLK31, which are the areas NU that do not store data, may store sensitive data mBTD5 and mBTD6 other than the firmware data FWD and the replicated firmware data FWD_R. For example, the memory block RTBLK21 may store a fifth portion mBTD5 of the sensitive data mBTD5 and mBTD6, and the memory block RTBLK31 may store a sixth portion mBTD6 of the sensitive data mBTD5 and mBTD6.

In some example embodiments, the sensitive data mBTD1 and mBTD2 may include a result of the BIST operation (or memory BIST (mBIST) operation) that is performed in a packaging process performed while the nonvolatile memory device is manufacturing. For example, the sensitive data mBTD1 and mBTD2 may include pass/fail information of the BIST operation, bad block (BB) information of the nonvolatile memory device, uncorrectable error correction code (UECC) information of the nonvolatile memory device, program loop count information of the nonvolatile memory device, erase loop count information of the nonvolatile memory device, etc. The sensitive data mBTD1 and mBTD2 may be obtained in a package state, and may be referred to as BIST data or mBIST data. The memory blocks FWBLK2 and FWBLK3 may store mBIST data, and thus may be referred to as mMCBs to distinguish from MCBs.

Figure 5:
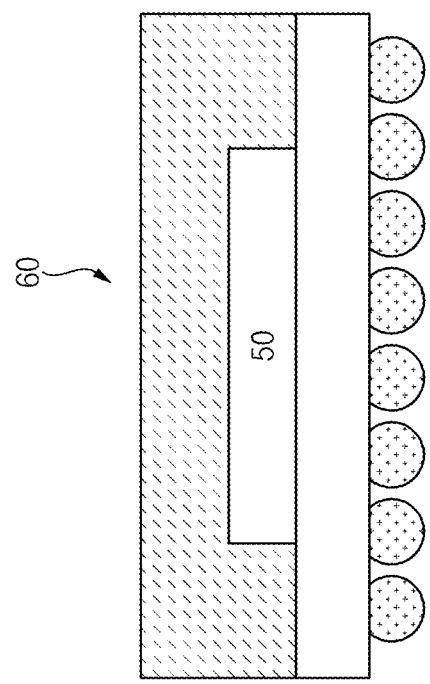
Figure 5:
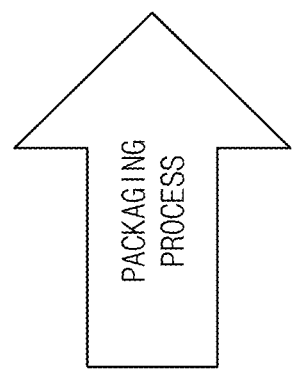
Figure 5:
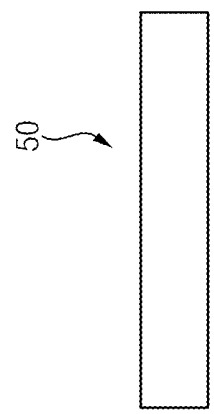

Referring to FIG. 5, an example of a packaging process that is performed while a nonvolatile memory device is manufacturing is illustrated.

To protect a nonvolatile memory chip (or die) 50 that is cut and/or separated from a wafer from various external environments, a nonvolatile memory package 60 may be fabricated by performing the packaging process on the nonvolatile memory chip 50. For example, the nonvolatile memory chip 50 may be mounted on and electrically connected to a package substrate (e.g., printed circuit board (PCB), etc.), a sealing member covering the package substrate and the nonvolatile memory chip 50 may be formed, connection structures (e.g., bumps, solder balls, etc.) for electrical connection between a lower surface of the package substrate and an external device may be formed, and thus the nonvolatile memory package 60 may be obtained. In some example embodiments, a single package may include a plurality of chips, and the plurality of chips may be electrically connected by bonding wires, through substrate vias (e.g., through silicon vias (TSVs)), etc.

After the nonvolatile memory package 60 is fabricated, various tests may be performed on the nonvolatile memory package 60. For example, DC tests, burn-in tests, post-burn tests, final tests, etc. may be performed, and the above-described BIST operation may be performed.

In some example embodiments, after the BIST operation is performed while the nonvolatile memory device is manufacturing, the BIST operation may be additionally performed as needed. For example, a rework operation for the nonvolatile memory package 60 may be required due to various reasons, such as product changes or customer requests after product shipment, and then it may be necessary to additionally perform the BIST operation and store the test result again. For example, it may be necessary to update the sensitive data mBTD1 and mBTD2, and the memory blocks FWBLK2 and FWBLK3 may be implemented such that the sensitive data mBTD1 and mBTD2 can be updated. Since the sensitive data mBTD1 and mBTD2 are essential data for the operation of the nonvolatile memory device, the nonvolatile memory device may be implemented to perform a read operation on the memory blocks FWBLK2 and FWBLK3. In addition, the nonvolatile memory device may be implemented to also perform a program operation and an erase operation on the memory blocks FWBLK2 and FWBLK3 such that the sensitive data mBTD1 and mBTD2 is updated when necessary.

Conventionally, the result of the BIST operation was stored in a separate special block (e.g., CD block). In the nonvolatile memory device according to example embodiments, the result of the BIST operation may be stored using an existing unused memory block. For example, when the number of memory planes increases, the unused memory blocks FWBLK2 and FWBLK3 may occur, and thus the sensitive data mBTD1 and mBTD2 resulting from the BIST operation may be stored in the unused memory blocks FWBLK2 and FWBLK3. Accordingly, the BIST data or the mBIST data may be efficiently managed without adding blocks.

Figure 6:
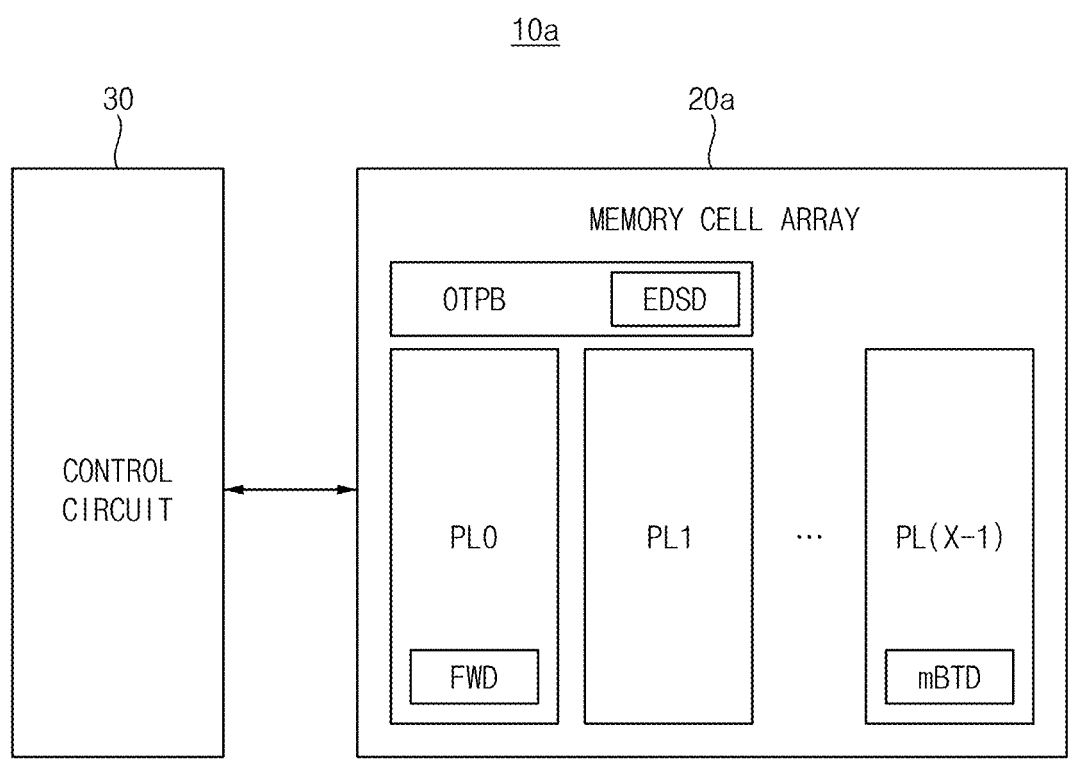
FIG. 6 is a block diagram illustrating a nonvolatile memory device according to example embodiments.

FIG. 6 is a block diagram illustrating a nonvolatile memory device according to example embodiments. The descriptions repeated with or overlapping with descriptions of FIG. 1 will be omitted in the interest of brevity.

Referring to FIG. 6, a nonvolatile memory device 10a includes a memory cell array 20a and a control circuit 30.

The nonvolatile memory device 10a may be the same as the nonvolatile memory device 10 of FIG. 1, except that a configuration of the memory cell array 20a is partially changed.

The memory cell array 20a may further include a memory block OTPB. The memory block OTPB may store third sensitive data EDSD.

In some example embodiments, the third sensitive data EDSD may be a different type of data from the first sensitive data FWD and the second sensitive data mBTD, and may be data that is required while the nonvolatile memory device 10a is operating. For example, the third sensitive data EDSD may be data that is obtained during a second manufacturing process for the nonvolatile memory device 10a different from the first manufacturing process. For example, the second manufacturing process may be an electrical die sorting (EDS) process that is performed while the nonvolatile memory device 10a is manufacturing, and the third sensitive data EDSD may include a result of an EDS test operation that is performed in the EDS process.

For example, the third sensitive data EDSD may include map information (or chip ID information), pass/fail information of the EDS test operation, manufacturing information (or unique ID information), CMT information, etc. The third sensitive data EDSD may be data obtained in a wafer state, and may be referred to as EDS data.

For convenience of illustration, although FIG. 6 illustrated that the memory block OTPB is not included in the plurality of memory planes PL0 to PL(X−1), example embodiments of the invention are not limited thereto, and the memory block OTPB may be implemented as a part of an arbitrary memory plane.

Figure 7:
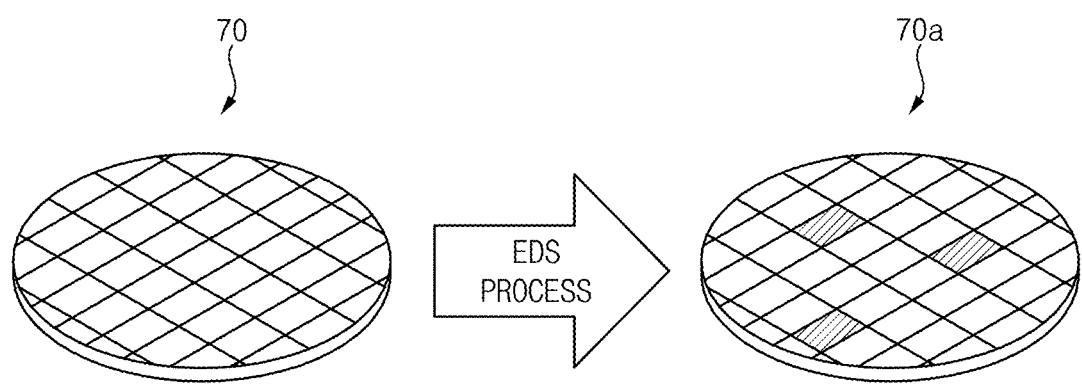
FIG. 7 is a diagram for describing an operation and a configuration of a nonvolatile memory device according to example embodiments.

FIG. 7 is a diagram for describing an operation and a configuration of a nonvolatile memory device according to example embodiments.

Referring to FIG. 7, an example of an EDS process that is performed while a nonvolatile memory device is manufacturing is illustrated.

After a plurality of nonvolatile memory chips are fabricated by performing an oxidation process, a photolithography process, an etching process, a deposition and/or ion implantation process, a metal wiring process, etc. on a wafer, the EDS process may be performed to check whether each nonvolatile memory chip has reached a target quality level. For example, electrical tests, wafer burn-in tests, hot/cold tests, repair/final tests, etc. may be performed, and finally, defective chips may be identified by inking. For example, a wafer 70 on the left side in FIG. 7 may represent a wafer before the EDS process, a wafer 70a on the right side in FIG. 7 may represent a wafer after the EDS process, and hatched portions in the wafer 70a may represent defective chips.

In some example embodiments, the EDS test operation may be performed while the nonvolatile memory device is manufacturing, and the EDS test operation may not be performed again thereafter. For example, each nonvolatile memory chip (e.g., the nonvolatile memory chip 50 in FIG. 5) may be provided by cutting the wafer 70a after the EDS process, and thus it may be impossible to perform the EDS process and/or the EDS test operation thereafter. In other words, it may be unnecessary to update the third sensitive data EDSD, and the memory block OTPB may be implemented such that the third sensitive data EDSD cannot be updated. Since the third sensitive data EDSD are essential data for the operation of the nonvolatile memory device, the nonvolatile memory device may be implemented to perform a read operation on the memory block OTPB. In addition, the nonvolatile memory device may be implemented to not perform a program operation and an erase operation on the memory block OTPB such that the third sensitive data EDSD cannot be updated. For example, the memory block OTPB may permit to be programmed only once.

Conventionally, the result of the EDS process was stored in a separate special block (e.g., security block), and as described above, the result of the BIST operation was stored in another separate special block (e.g., CD block). As the number of wordlines and block size of a nonvolatile memory device has increased, the total number of blocks has decreased, and thus there was an attempt to integrate and manage the security block and the CD block into one OTP block. However, the security block should perform only a read operation without program/erase operations, the CD block should perform all of program/erase/read operations, and thus there was a problem in that data management was difficult.

In the nonvolatile memory device according to example embodiments, the result of the EDS process and the result of the BIST operation may be stored separately. For example, the sensitive data EDSD resulting from the EDS process may be stored in a separate memory block OTPB, which is an OTP block. For example, the sensitive data mBTD1 and mBTD2 resulting from the BIST operation may be stored in the unused memory blocks FWBLK2 and FWBLK3, which occur as the number of memory planes increases. Accordingly, both the EDS data and the BIST data (or mBIST data) may be efficiently managed by additionally setting only the OTP block for the EDS data and by storing the BIST data (or mBIST data) using an existing unused memory block. As a result, the integrity of the EDS data may be guaranteed or ensured, the program/erase operations may be performed when the rework operation is performed on the BIST data (or mBIST data), and thus the deterioration of performance of the nonvolatile memory device may be prevented.

FIGS. 8, 9, 10 and 11 are diagrams for describing an operation and a configuration of a nonvolatile memory device according to example embodiments. The descriptions repeated with or overlapping with descriptions of FIGS. 2, 3A, 3B and 4 will be omitted in the interest of brevity.

Figure 8:
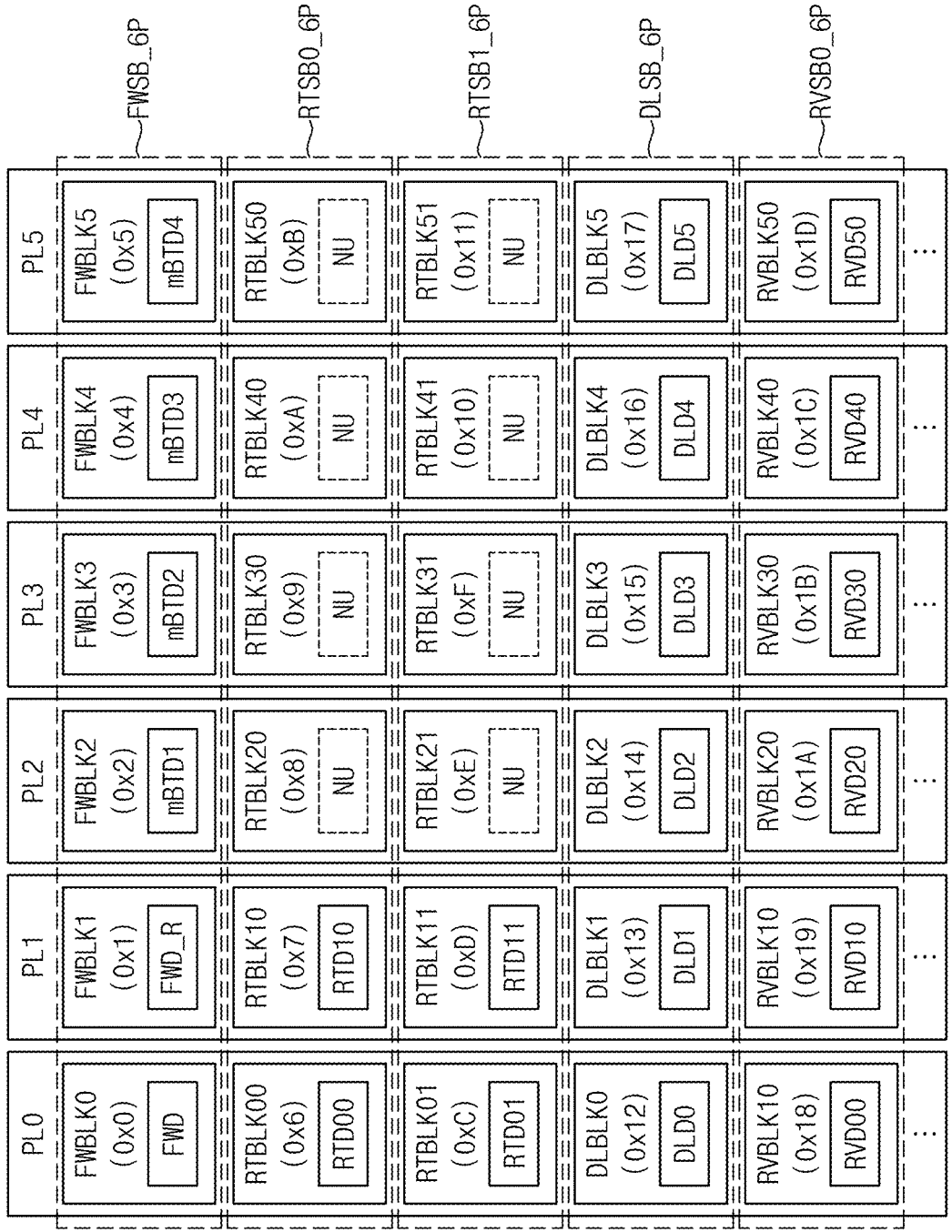
FIGS. 8, 9, 10 and 11 are diagrams for describing an operation and a configuration of a nonvolatile memory device according to example embodiments.

Referring to FIG. 8, when super blocks are set on six memory planes PL0, PL1, PL2, PL3, PL4 and PL5 in a nonvolatile memory device, an example of storing sensitive data in unused memory blocks according to an example embodiment is illustrated.

Configurations of the memory planes PL0, PL1, PL2 and PL3 may be the same as the configurations of the memory planes PL0, PL1, PL2 and PL3 in FIG. 4. The fifth and sixth memory planes PL4 and PL5 and memory blocks FWBLK4, RTBLK40, RTBLK41, DLBLK4, RVBLK40, FWBLK5, RTBLK50, RTBLK51, DLBLK5, and RVBLK50 included therein may be configured as shown, and data DLD4, DLD5, RVD40 and RVD50 may be stored as shown. In addition, addresses of 0x(6K), 0x(6K+1), 0x(6K+2), 0x(6K+3), 0x(6K+4) and 0x(6K+5) may be set for the memory blocks as shown, and super blocks FWSB_6P, RTSB0_6P, RTSB1_6P, DLSB_6P and RVSB0_6P may be configured as shown.

Among the memory blocks FWBLK0, FWBLK1, FWBLK2, FWBLK3, FWBLK4 and FWBLK5 in the first super block FWSB_6P, the memory blocks FWBLK2, FWBLK3, FWBLK4 and FWBLK5, which are the areas NU that do not store data, may store sensitive data mBTD1, mBTD2, mBTD3 and mBTD4 other than the firmware data FWD and the replicated firmware data FWD_R. For example, the memory block FWBLK4 may store a third portion mBTD3 of the sensitive data mBTD1, mBTD2, mBTD3 and mBTD4, and the memory block FWBLK5 may store a fourth portion mBTD4 of the sensitive data mBTD1, mBTD2, mBTD3 and mBTD4.

Figure 9:
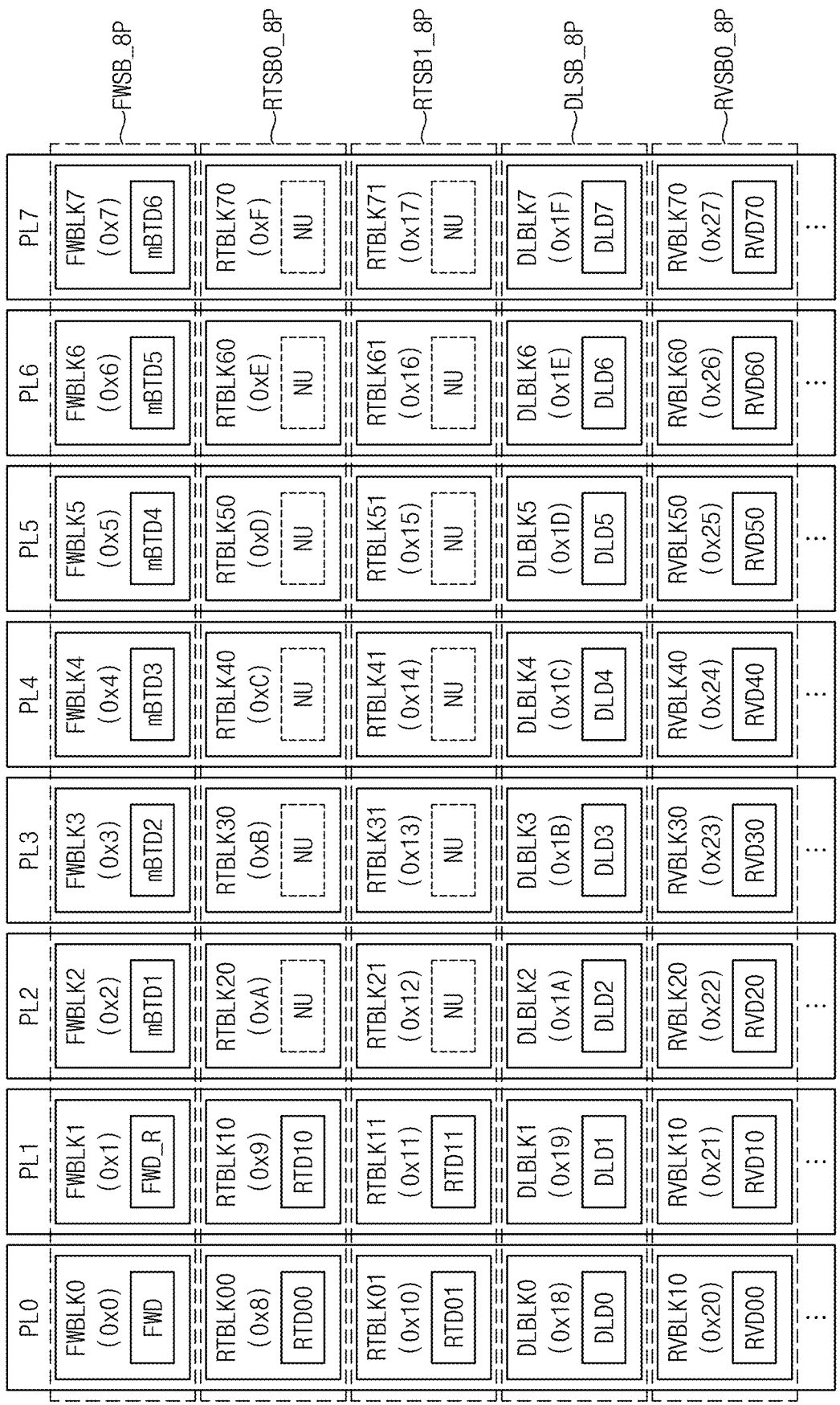

Referring to FIG. 9, when super blocks are set on eight memory planes PL0, PL1, PL2, PL3, PL4, PL5, PL6 and PL7 in a nonvolatile memory device, an example of storing sensitive data in unused memory blocks according to an example embodiment is illustrated.

Configurations of the memory planes PL0, PL1, PL2, PL3, PL4 and PL5 may be the same as the configurations of the memory planes PL0, PL1, PL2, PL3, PL4 and PL5 in FIG. 8. The seventh and eighth memory planes PL6 and PL7 and memory blocks FWBLK6, RTBLK60, RTBLK61, DLBLK6, RVBLK60, FWBLK7, RTBLK70, RTBLK71, DLBLK7, and RVBLK70 included therein may be configured as shown, and data DLD6, DLD7, RVD60 and RVD70 may be stored as shown. In addition, addresses of 0x(8K), 0x(8K+1), 0x(8K+2), 0x(8K+3), 0x(8K+4), 0x(8K+5), 0x(8K+6) and 0x(8K+7) may be set for the memory blocks as shown, and super blocks FWSB_8P, RTSB0_8P, RTSB1_8P, DLSB_8P and RVSB0_8P may be configured as shown.

Among the memory blocks FWBLK0, FWBLK1, FWBLK2, FWBLK3, FWBLK4, FWBLK5, FWBLK6 and FWBLK7 in the first super block FWSB_8P, the memory blocks FWBLK2, FWBLK3, FWBLK4, FWBLK5, FWBLK6 and FWBLK7, which are the areas NU that do not store data, may store sensitive data mBTD1, mBTD2, mBTD3, mBTD4, mBTD5 and mBTD6 other than the firmware data FWD and the replicated firmware data FWD_R. For example, the memory block FWBLK6 may store a fifth portion mBTD5 of the sensitive data mBTD1, mBTD2, mBTD3, mBTD4, mBTD5 and mBTD6, and the memory block FWBLK7 may store a sixth portion mBTD6 of the sensitive data mBTD1, mBTD2, mBTD3, mBTD4, mBTD5 and mBTD6.

Figure 10:
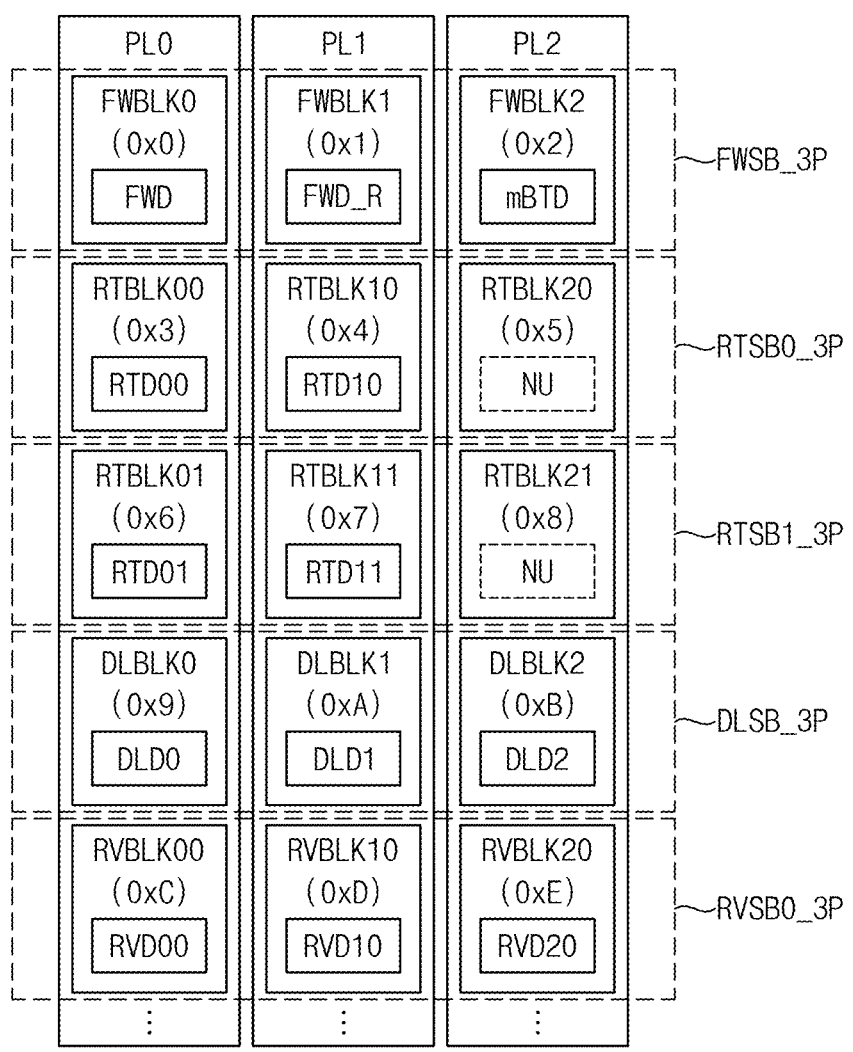

Referring to FIG. 10, when super blocks are set on three memory planes PL0, PL1 and PL2 in a nonvolatile memory device, an example of storing sensitive data in unused memory blocks according to an example embodiment is illustrated. In other words, example embodiments may be applied or employed not only to examples including an even number of memory planes, but also to examples including an odd number of memory planes.

Configurations of the memory planes PL0, PL1 and PL2 may be the same as the configurations of the memory planes PL0, PL1 and PL2 in FIG. 4. Addresses of 0x(3K), 0x(3K+1) and 0x(3K+2) may be set for the memory blocks as shown, and super blocks FWSB_3P, RTSB0_3P, RTSB1_3P, DLSB_3P and RVSB0_3P may be configured as shown.

Among the memory blocks FWBLK0, FWBLK1 and FWBLK2 in the first super block FWSB_3P, the memory blocks FWBLK2, which is the area NU that do not store data, may store sensitive data mBTD other than the firmware data FWD and the replicated firmware data FWD_R.

Figure 11:
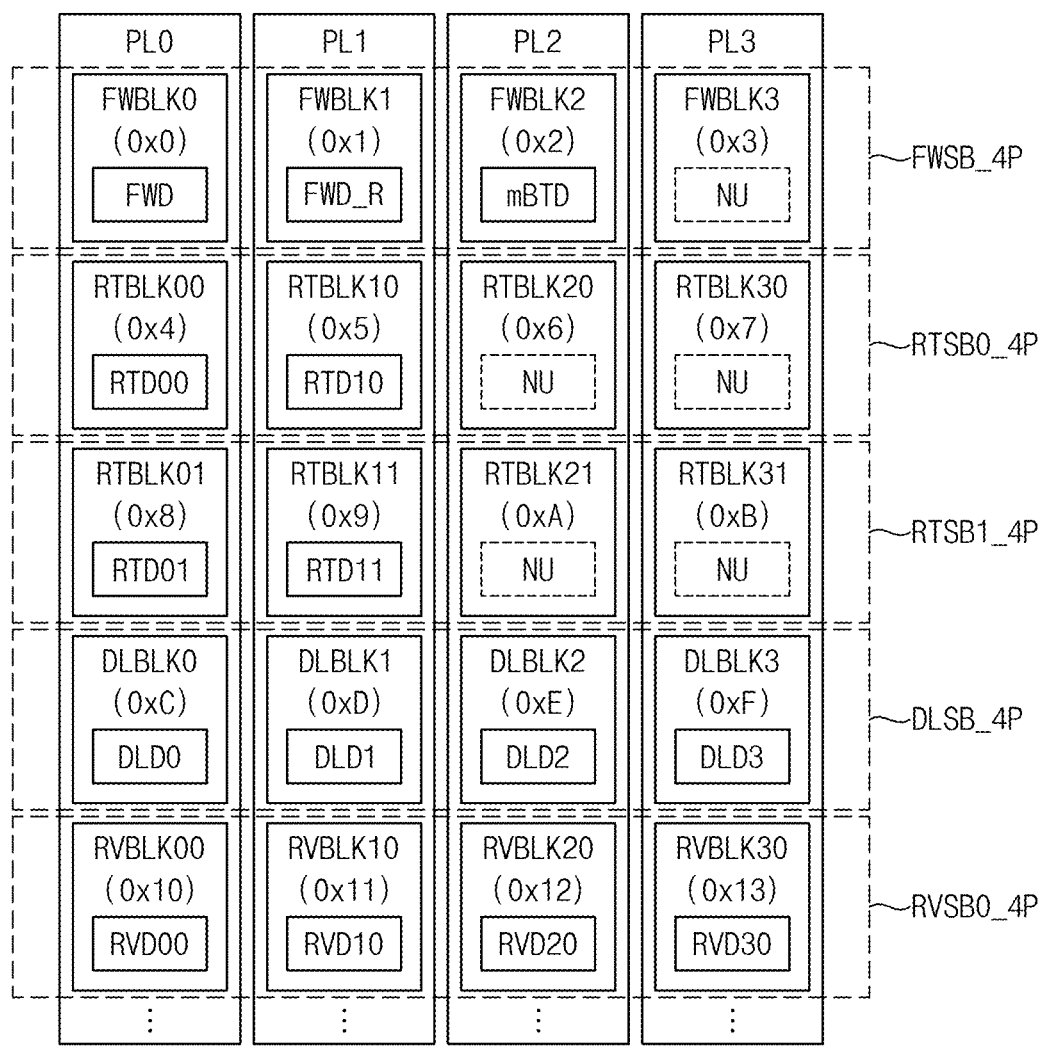

Referring to FIG. 11, when super blocks are set on four memory planes PL0, PL1, PL2 and PL3 in a nonvolatile memory device, an example of storing sensitive data in unused memory blocks according to an example embodiment is illustrated.

Among the memory blocks FWBLK0, FWBLK1, FWBLK2 and FWBLK3 in the first super block FWSB_4P, only the memory block FWBLK2 among the memory blocks FWBLK2 and FWBLK3 that are the areas NU that do not store data may store sensitive data mBTD other than the firmware data FWD and the replicated firmware data FWD_R. For example, the memory block FWBLK3 may still be the unused and empty area.

Although not illustrated in detail, even in the examples of FIGS. 8 and 9, sensitive data may be stored in only some of the unused memory blocks in the firmware super block and the remaining memory blocks may still be the unused and empty areas.

Although example embodiments are described based on that a specific number of memory planes, example embodiments of the invention are not limited thereto, and example embodiments may be applied or employed to various examples including an arbitrary number (e.g., two or more) of memory planes. In some example embodiments, sensitive data may be stored not only in unused memory blocks in the firmware super block, but also in unused memory blocks in the root super blocks.

Figure 12:
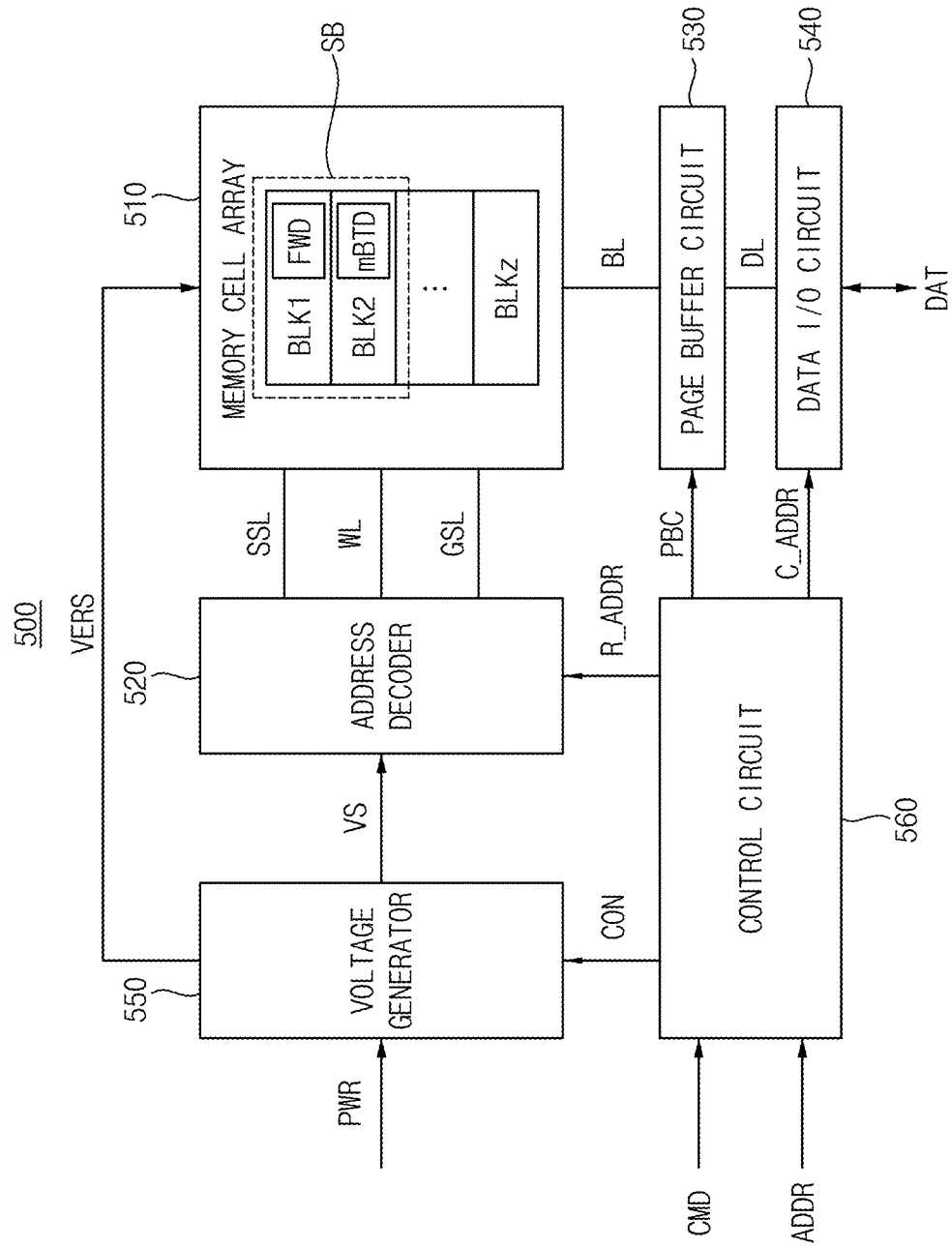
FIG. 12 is a block diagram illustrating a nonvolatile memory device according to example embodiments.

FIG. 12 is a block diagram illustrating a nonvolatile memory device according to example embodiments.

Referring to FIG. 12, a nonvolatile memory device 500 may include a memory cell array 510, an address decoder 520, a page buffer circuit 530, a data input/output (I/O) circuit 540, a voltage generator 550 and a control circuit 560. For example, the memory cell array 510 and the control circuit 560 may correspond to the memory cell array 20 and the control circuit 30 in FIG. 1, respectively.

The memory cell array 510 may be connected to the address decoder 520 via a plurality of string selection lines SSL, a plurality of wordlines WL and a plurality of ground selection lines GSL. The memory cell array 510 may be further connected to the page buffer circuit 530 via a plurality of bitlines BL. The memory cell array 510 may include a plurality of memory cells (e.g., a plurality of nonvolatile memory cells) that are connected to the plurality of wordlines WL and the plurality of bitlines BL. The memory cell array 510 may be divided into a plurality of memory blocks BLK1 to BLKz each of which includes memory cells, where z is a natural number greater than two.

The memory cell array 510 may be controlled in units of the super blocks according to example embodiments. The different memory blocks BLK1 and BLK2, which are included in different memory planes and the same super block SB, may store the first and second sensitive data FWD and mBTD that are different from each other.

In some example embodiments, the plurality of memory cells included in the memory cell array 510 may be arranged in a two-dimensional (2D) array structure or a three-dimensional (3D) vertical array structure. The 3D vertical array structure may include vertical cell strings that are vertically oriented such that at least one memory cell is located over another memory cell. The at least one memory cell may comprise a charge trap layer. The following patent documents, which are hereby incorporated by reference in their entireties, describe configurations for a memory cell array including a 3D vertical array structure, in which the three-dimensional memory array is configured as a plurality of levels, with wordlines and/or bitlines shared between levels: U.S. Pat. Nos. 7,679,133; 8,553,466; 8,654,587; 8,559,235; and U.S. Pat. Pub. No. 2011/0233648.

The control circuit 560 may receive a command CMD and an address ADDR from an outside (e.g., from a storage controller 722 in FIG. 15), and controls erasure, programming and read operations of the nonvolatile memory device 500 based on the command CMD and the address ADDR. An erasure operation may include performing a sequence of erase loops, and a program operation may include performing a sequence of program loops. Each program loop may include a program operation and a program verification operation. Each erase loop may include an erase operation and an erase verification operation. The read operation may include a normal read operation and data recovery read operation. In addition, the control circuit 560 may control the operation of the memory cell array 510 in units of the super blocks.

For example, the control circuit 560 may generate control signals CON, which are used for controlling the voltage generator 550, and may generate a control signal PBC for controlling the page buffer circuit 530, based on the command CMD, and may generate a row address R_ADDR and a column address C_ADDR based on the address ADDR. The control circuit 560 may provide the row address R_ADDR to the address decoder 520 and may provide the column address C_ADDR to the data I/O circuit 540.

The address decoder 520 may be connected to the memory cell array 510 via the plurality of string selection lines SSL, the plurality of wordlines WL and the plurality of ground selection lines GSL. For example, in the data erase/write/read operations, the address decoder 520 may determine at least one of the plurality of wordlines WL as a selected wordline, may determine at least one of the plurality of string selection lines SSL as a selected string selection line, and may determine at least one of the plurality of ground selection lines GSL as a selected ground selection line, based on the row address R_ADDR.

The voltage generator 550 may generate voltages VS that are required for an operation of the nonvolatile memory device 500 based on a power PWR and the control signals CON. The voltages VS may be applied to the plurality of string selection lines SSL, the plurality of wordlines WL and the plurality of ground selection lines GSL via the address decoder 520. In addition, the voltage generator 550 may generate an erase voltage VERS that is required for the data erase operation based on the power PWR and the control signals CON. The erase voltage VERS may be applied to the memory cell array 510 directly or via the bitline BL.

The page buffer circuit 530 may be connected to the memory cell array 510 via the plurality of bitlines BL. The page buffer circuit 530 may include a plurality of page buffers including a plurality of latches. The page buffer circuit 530 may store data DAT to be programmed into the memory cell array 510 or may read data DAT sensed from the memory cell array 510. In other words, the page buffer circuit 530 may operate as a write driver or a sense amplifier depending on an operation mode of the nonvolatile memory device 500.

The data I/O circuit 540 may be connected to the page buffer circuit 530 via data lines DL. The data I/O circuit 540 may provide the data DAT from the outside of the nonvolatile memory device 500 to the memory cell array 510 via the page buffer circuit 530 or may provide the data DAT from the memory cell array 510 to the outside of the nonvolatile memory device 500, based on the column address C_ADDR.

Figure 13:
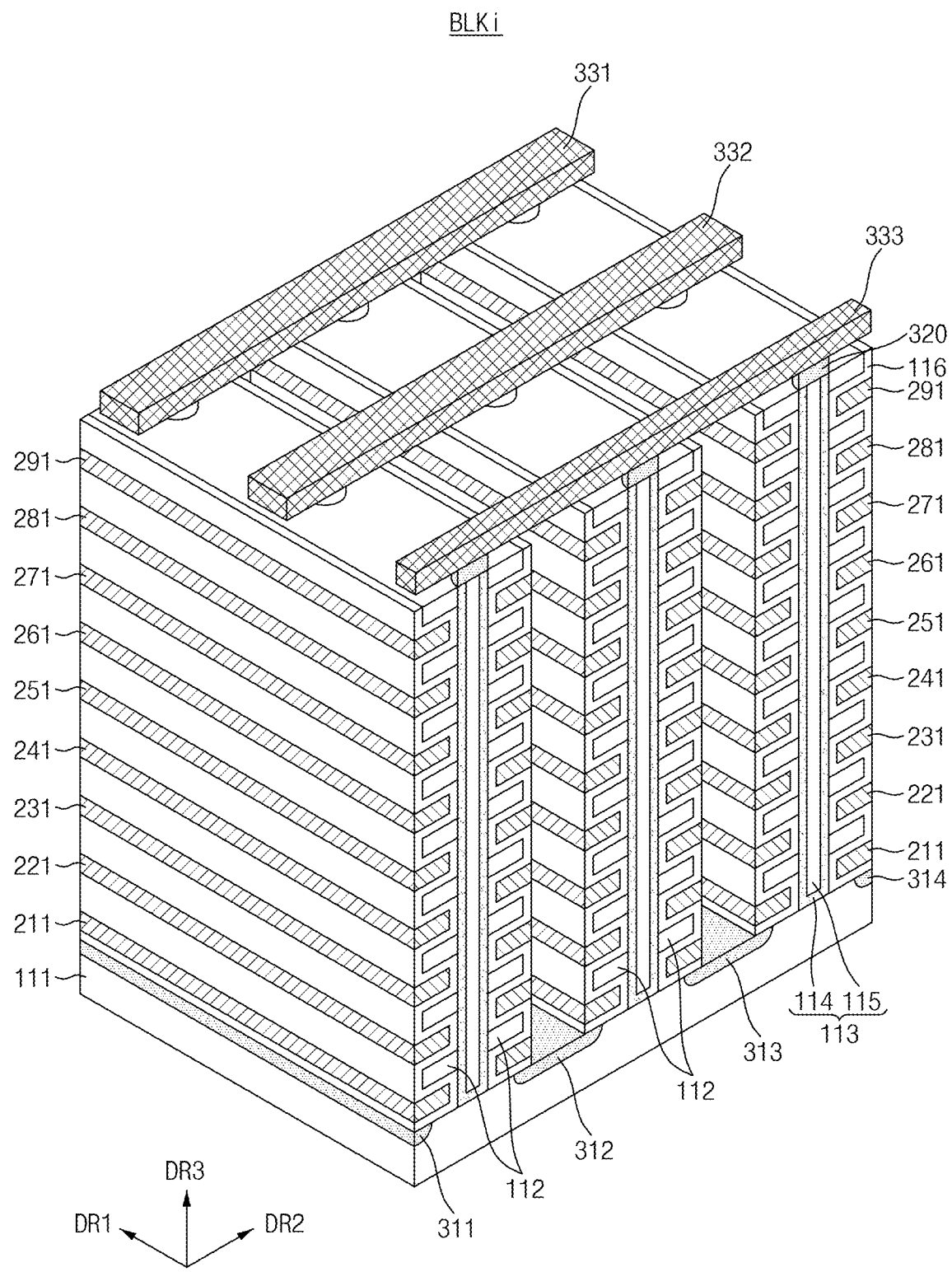
FIG. 13 is a perspective view of an example of a memory block included in a memory cell array in the nonvolatile memory device of FIG. 12 according to example embodiments.

FIG. 13 is a perspective view of an example of a memory block included in a memory cell array in the nonvolatile memory device of FIG. 12 according to example embodiments.

Referring to FIG. 13, a memory block BLKi may include a plurality of cell strings (e.g., a plurality of vertical NAND strings) which may be formed on a substrate in a 3D structure (or a vertical structure). The memory block BLKi may include structures extending along a first direction DR1, a second direction DR2, and/or a third direction DR3. Two directions may be substantially parallel to a first surface (e.g., a top surface) of a substrate 111 and may cross each other, and may be respectively referred to as the first direction DR1 (e.g., a X-axis direction) and the second direction DR2 (e.g., a Y-axis direction). In addition, a direction vertical to the first surface of the substrate 111 may be referred to as the third direction DR3 (e.g., a Z-axis direction). For example, the first and second directions DR1 and DR2 may be perpendicular to each other. In addition, the third direction DR3 may be perpendicular to both the first and second directions DR1 and DR2.

The substrate 111 may be provided. The substrate 111 may have a well of a first type of charge carrier impurity (e.g., a first conductivity type) therein. For example, the substrate 111 may have a p-well formed by implanting a group III element such as, but not limited to, boron (B). As another example, the substrate 111 may have a pocket p-well provided within an n-well. In an embodiment, the substrate 111 may have a p-type well (or a p-type pocket well). However, the conductive type of the substrate 111 is not limited to p-type.

A plurality of doping regions (e.g., a first doping region 311, a second doping region 312, a third doping region 313, and a fourth doping region 314) that may be arranged along the second direction DR2 may be provided in and/or on the substrate 111. The plurality of doping regions 311 to 314 may have a second type of charge carrier impurity (e.g., a second conductivity type) different from the first type of the substrate 111. In an embodiment, the first to fourth doping regions 311 to 314 may be an n-type. However, the conductive type of the first to fourth doping regions 311 to 314 is not limited to n-type.

A plurality of insulation materials 112 extending along the first direction DR1 may be sequentially provided along the third direction DR3 on a region of the substrate 111 between the first and second doping regions 311 and 312. For example, the plurality of insulation materials 112 may be provided along the third direction DR3, being spaced by a specific distance. The insulation materials 112 may include an insulation material such as, but not limited to, an oxide layer.

A plurality of pillars 113 penetrating the insulation materials along the third direction DR3 may be sequentially disposed along the first direction DR1 on a region of the substrate 111 between the first and second doping regions 311 and 312. For example, the plurality of pillars 113 may at least partially penetrate the insulation materials 112 to contact the substrate 111.

In some example embodiments, each pillar of the plurality of pillars 113 may include a plurality of materials. For example, a channel layer 114 of each pillar 113 may include a silicon material having a first conductivity type. As another example, the channel layer 114 of each pillar of the plurality of pillars 113 may include a silicon material having the same conductivity type as the substrate 111. In an embodiment, the channel layer 114 of each pillar of the plurality of pillars 113 may include, but not be limited to, p-type silicon.

However, the channel layer 114 of each pillar of the plurality of pillars 113 is not limited to the p-type silicon.

An internal material 115 of each pillar of the plurality of pillars 113 may include an insulation material. For example, the internal material 115 of each pillar of the plurality of pillars 113 may include an insulation material such as, but not be limited to, a silicon oxide. In an example, the internal material 115 of each pillar 113 may include an air gap. As used herein, the term air may refer to atmospheric air and/or other gases that may be present during the manufacturing process.

An insulation layer 116 may be provided along the exposed surfaces of the insulation materials 112, the plurality of pillars 113, and the substrate 111, on a region between the first and second doping regions 311 and 312. For example, the insulation layer 116 provided on surfaces of the insulation material 112 may be interposed between the plurality of pillars 113 and a plurality of stacked first conductive materials (e.g., a first conductive material 211, a second conductive material 221, a third conductive material 231, a fourth conductive material 241, a fifth conductive material 251, a sixth conductive material 261, a seventh conductive material 271, an eighth conductive material 281, and a ninth conductive material 291), as shown in FIG. 13. In some embodiments, the insulation layer 116 may not be provided on surfaces of the insulation material 112 corresponding to string selection lines SSL (e.g., ninth conductive material 291). In such embodiments, ground selection lines GSL may be the lowermost ones of the stack of first conductive materials 211, 221, 231, 241, 251, 261, 271, 281 and 291 and the string selection lines SSL may be the uppermost ones of the stack of first conductive materials 211, 221, 231, 241, 251, 261, 271, 281 and 291.

The plurality of first conductive materials 211, 221, 231, 241, 251, 261, 271, 281 and 291 may be provided on surfaces of the insulation layer 116, in a region between the first and second doping regions 311 and 312. For example, the first conductive material 211 extending along the first direction DR1 may be provided between the insulation material 112 adjacent to the substrate 111 and the substrate 111. For example, the first conductive material 211 extending along the first direction DR1 may be provided between the insulation layer 116 at the bottom of the insulation material 112 adjacent to the substrate 111 and the substrate 111.

A first conductive material extending along the first direction DR1 may be provided between the insulation layer 116 at the top of the specific insulation material from among the insulation materials 112 and the insulation layer 116 at the bottom of a specific insulation material from among the insulation materials 112. For example, a plurality of first conductive materials 221, 231, 241, 251, 261, 271 and 281 extending along the first direction DR1 may be provided between the insulation materials 112. It is to be understood that the insulation layer 116 may be provided between the insulation materials 112 and the first conductive materials 221, 231, 241, 251, 261, 271 and 281. Each of the plurality of stacked first conductive materials 211, 221, 231, 241, 251, 261, 271, 281 and 291 may be formed of a conductive metal. However, the present invention is not limited in this regard, and each of the plurality of stacked first conductive materials 211, 221, 231, 241, 251, 261, 271, 281 and 291 may include a conductive material such as, but not limited to, a polysilicon in other embodiments.

The same and/or substantially similar structures as those on the first and second doping regions 311 and 312 may be provided in a region between the second and third doping regions 312 and 313. In the region between the second and third doping regions 312 and 313, a plurality of insulation materials 112 may be provided, which may extend along the first direction DR1. A plurality of pillars 113 may be provided that may be disposed sequentially along the first direction DR1 and at least partially penetrate the plurality of insulation materials 112 along the third direction DR3. An insulation layer 116 may be provided on the exposed surfaces of the plurality of insulation materials 112 and the plurality of pillars 113, and the plurality of stacked first conductive materials 211, 221, 231, 241, 251, 261, 271, 281 and 291 may extend along the first direction DR1. Similarly, the same and/or substantially similar structures as those on the first and second doping regions 311 and 312 may be provided in a region between the third and fourth doping regions 313 and 314.

A plurality of drain regions 320 may be provided on the plurality of pillars 113, respectively. The drain regions 320 may include, but not be limited to, silicon materials doped with a second type of charge carrier impurity. For example, the drain regions 320 may include silicon materials doped with an n-type dopant. In an embodiment, the drain regions 320 may include n-type silicon materials. However, the drain regions 320 are not limited to n-type silicon materials.

On the drain regions, a plurality of second conductive materials (e.g., a tenth conductive material 331, an eleventh conductive material 332, and a twelfth conductive material 333) may be provided, which may extend along the second direction DR2. The second conductive materials 331 to 333 may be disposed along the first direction DR1, being spaced apart from each other by a specific distance. The second conductive materials 331 to 333 may be respectively connected to the drain regions 320 in a corresponding region. The drain regions 320 and the twelfth conductive material 333 extending along the second direction DR2 may be connected through each contact plug. Each contact plug may be, for example, a conductive plug formed of a conductive material such as, but not limited to, a metal. The second conductive materials 331 to 333 may include metal materials. The second conductive materials 331 to 333 may include conductive materials such as, but not limited to, a polysilicon.

As illustrated in FIG. 13, the stacked first conductive materials 211, 221, 231, 241, 251, 261, 271, 281 and 291 may be used to form the wordlines WL, the string selection lines SSL, and the ground selection lines GSL. For example, the stacked first conductive materials 221, 231, 241, 251, 261, 271 and 281 may be used to form the wordlines WL, where conductive materials belonging to the same layer may be interconnected. The second conductive materials 331 to 333 may be used to form the bitlines BL. The number of layers of the stacked first conductive materials 211, 221, 231, 241, 251, 261, 271, 281 and 291 may be variously determined according to process and control techniques.

Figure 14:
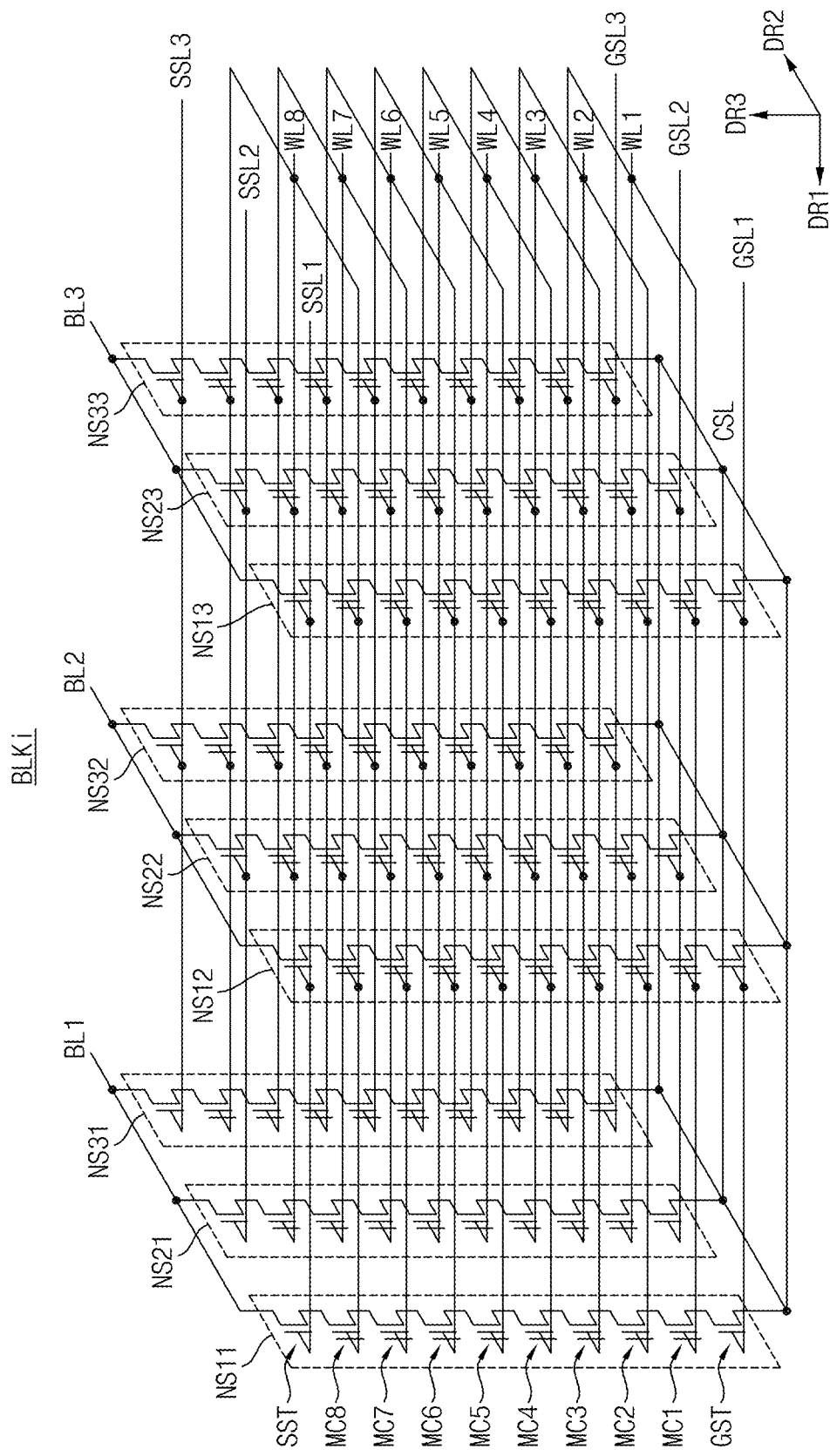
FIG. 14 is a circuit diagram illustrating an equivalent circuit of the memory block described with reference to FIG. 13 according to example embodiments.

FIG. 14 is a circuit diagram illustrating an equivalent circuit of the memory block described with reference to FIG. 13 according to example embodiments.

A memory block BLKi of FIG. 14 may be formed on a substrate in a 3D structure (or a vertical structure). For example, a plurality of cell strings included in the memory block BLKi may be formed in a direction perpendicular to the substrate.

Referring to FIG. 14, the memory block BLKi may include a plurality of cell strings (e.g., a first cell string NS11, a second cell string NS12, a third cell string NS13, a fourth cell string NS21, a fifth cell string NS22, a sixth cell string NS23, a seventh cell string NS31, an eighth cell string NS32, and a ninth cell string NS33) that may be connected (e.g., communicatively coupled) between bitlines (e.g., a first bitline BL1, a second bitline BL2, and a third bitline BL3) and a common source line CSL. Each of the cell strings NS11, NS12, NS13, NS21, NS22, NS23, NS31, NS32 and NS33 may include a string selection transistor SST, a plurality of memory cells (e.g., a first memory cell MC1, a second memory cell MC2, a third memory cell MC3, a fourth memory cell MC4, a fifth memory cell MC5, a sixth memory cell MC6, a seventh memory cell MC7, and an eighth memory cell MC8), and a ground selection transistor GST. For example, the bitlines BL1 to BL3 may correspond to the second conductive materials 331 to 333 in FIG. 13, and the common source line CSL may be formed by interconnecting the first to fourth doping regions 311 to 314 in FIG. 13.

Each string selection transistor SST may be connected to a corresponding string selection line (e.g., one of a first string selection line SSL1, a second string selection line SSL2, and a third string selection line SSL3). The plurality of memory cells MC1 to MC8 may be connected (e.g., communicatively coupled) to corresponding wordlines (e.g., at least one of a first wordline WL1, a second wordline WL2, a third wordline WL3, a fourth wordline WL4, a fifth wordline WL5, a sixth wordline WL6, a seventh wordline WL7, and an eighth wordline WL8), respectively. Each ground selection transistor GST may be connected to a corresponding ground selection line (e.g., one of a first ground selection line GSL1, a second ground selection line GSL2, and a third ground selection line GSL3). Each string selection transistor SST may be connected to a corresponding bitline (e.g., one of first to third bitlines BL1 to BL3), and each ground selection transistor GST may be connected to the common source line CSL. As shown in FIG. 14, some of the string selection transistors SST may be connected to the same bitline (e.g., one of the first to third bitlines BL1 to BL3) to connect (e.g., communicatively connected) corresponding cell strings to the same bitline via appropriate selection via selection voltages applied to the appropriate first to third string selection lines SSL1 to SSL3 and first to third ground selection lines GSL1 to GSL3.

The cell strings connected in common to one bitline may form one column, and the cell strings connected to one string selection line may form one row. For example, the first, fourth, and seventh cell strings NS11, NS21 and NS31 connected to the first bitline BL1 may correspond to a first column, and the cell strings first, second, and third NS11, NS12 and NS13 connected to the first string selection line SSL1 may form a first row.

Wordlines (e.g., the first wordline WL1) having the same height may be commonly connected, and the first to third ground selection lines GSL1 to GSL3 and the first to third string selection lines SSL1 to SSL3 may be separated. Memory cells located at the same semiconductor layer may share a wordline. Cell strings in the same row may share a string selection line. The common source line CSL may be connected in common to all of the cell strings.

Continuing to refer to FIG. 14, the memory block BLKi may be connected to the first to eighth wordlines WL1 to WL8 and the first to third bitlines BL1 to BL3, and each of the cell strings NS11, NS12, NS13, NS21, NS22, NS23, NS31, NS32 and NS33 may include the first to eighth memory cells MC1 to MC8. However, example embodiments of the invention may not be limited thereto. In some example embodiments, each memory block may be connected to any number of wordlines and bitlines, and each cell string may include any number of memory cells.

Although the memory cell array is described based on a vertical memory cell array, the memory cell array according to example embodiments may be any memory cell array, e.g., a planar (or two-dimensional) memory cell array. Although the nonvolatile memory device is described based on a NAND flash memory device, the nonvolatile memory device, according to example embodiments, may be and/or may include other types of nonvolatile memory devices, such as, but not limited to, phase-change random access memory (PRAM) devices, resistive random access memory (RRAM) devices, nano floating gate memory (NFGM) devices, polymer random access memory (PoRAM) devices, magnetic random access memory (MRAM) devices, a ferroelectric random access memory (FRAM), thyristor random access memory (TRAM) devices, and the like.

Figure 15:
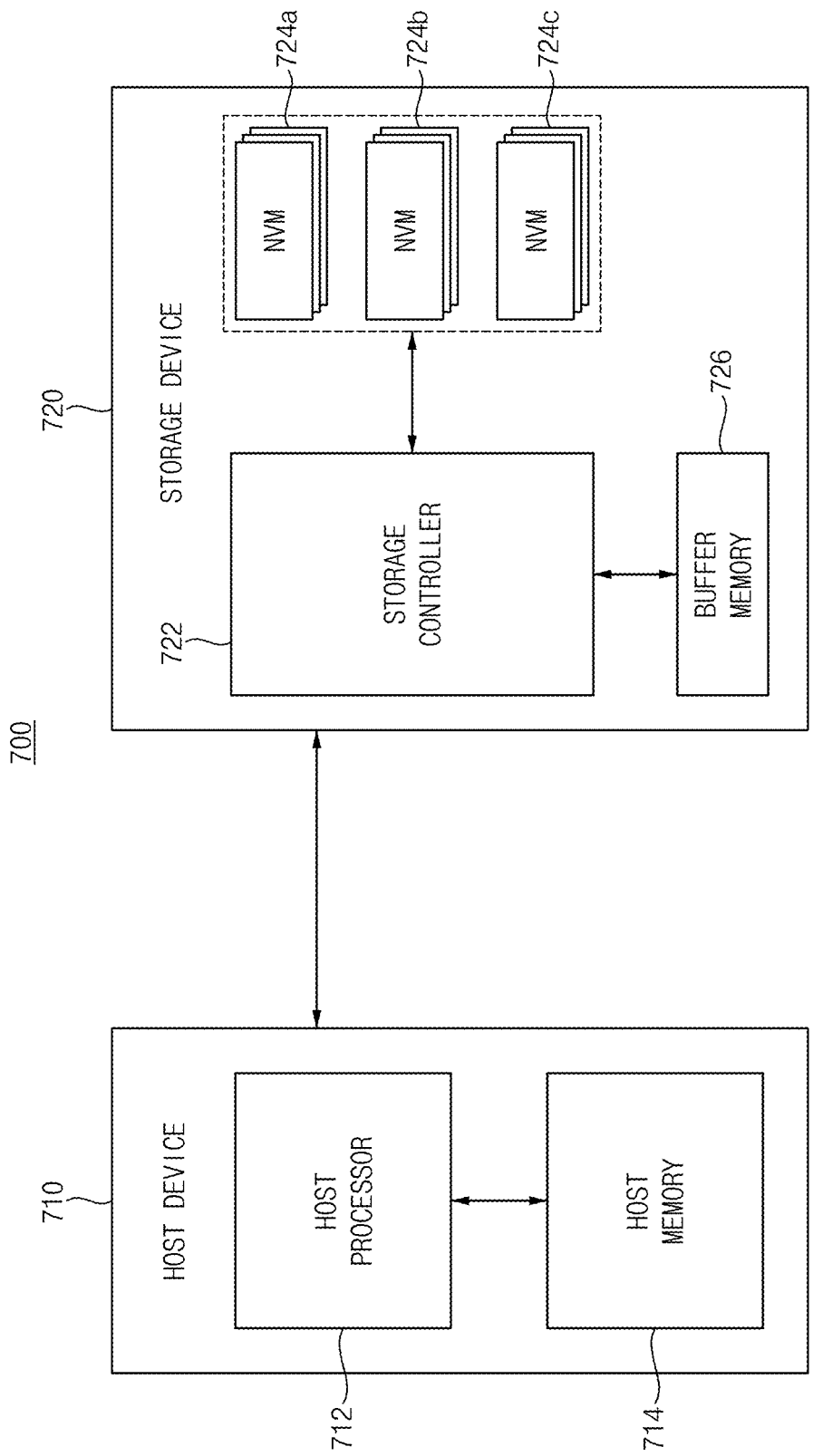
FIG. 15 is a block diagram illustrating a storage device and a storage system including the storage device according to example embodiments.

FIG. 15 is a block diagram illustrating a storage device and a storage system including the storage device according to example embodiments.

Referring to FIG. 15, a storage system 700 includes a host device 710 and a storage device 720.

The host device 710 controls overall operations of the storage system 700. The host device 710 may include a host processor 712 and a host memory 714. The host processor 712 may control an operation of the host device 710. For example, the host processor 712 may execute an operating system (OS). For example, the operating system may include a file system for file management and a device driver for controlling peripheral devices including the storage device 720 at the operating system level. The host memory 714 may store instructions and/or data that are executed and/or processed by the host processor 712.

The storage device 720 is accessed by the host device 710. The storage device 720 may include a storage controller 722, a plurality of nonvolatile memories 724a, 724b and 724c, and a buffer memory 726.

The storage controller 722 may control an operation of the storage device 720. For example, the storage controller 722 may control operations (e.g., a data write operation and/or a data read operation) of the plurality of nonvolatile memories 724a to 724c based on a request and data that are received from the host device 710.

The plurality of nonvolatile memories 724a to 724c may be controlled by the storage controller 722, and may store a plurality of data. For example, each of the plurality of nonvolatile memories 724a to 724c may store the sensitive data, meta data, various user data, or the like.

The buffer memory 726 may store instructions and/or data that are executed and/or processed by the storage controller 722, and may temporarily store data stored in or to be stored into the plurality of nonvolatile memories 724a to 724c. For example, the buffer memory 726 may include at least one of various volatile memories, e.g., a static random access memory (SRAM), a dynamic random access memory (DRAM), or the like.

Each of the plurality of nonvolatile memories 724a to 724c may be the nonvolatile memory device according to example embodiments described with reference to FIGS. 1, 2, 3A, 3B and 4 to 14, and may be controlled in units of the super blocks according to example embodiments. In each of the plurality of nonvolatile memories 724a to 724c, different memory blocks, which are included in different memory planes and the same super block, may store different types of sensitive data.

Figure 16:
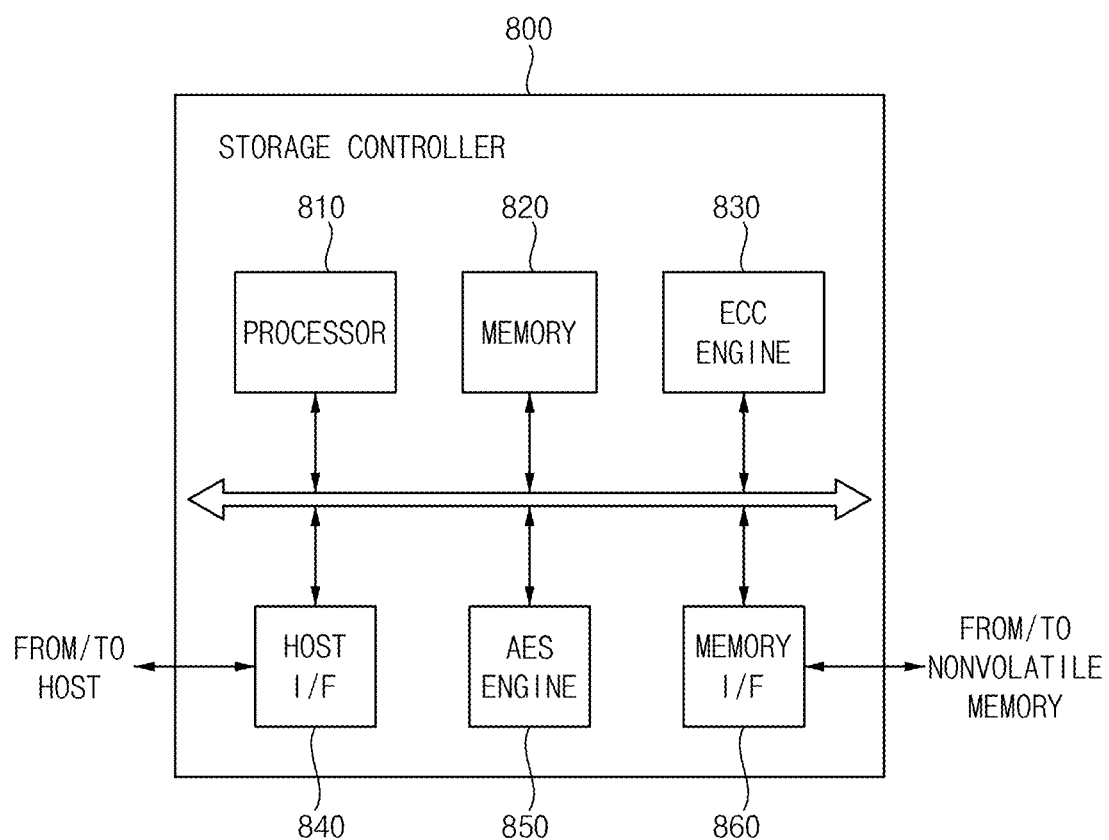
FIG. 16 is a block diagram illustrating an example of a storage controller included in a storage device according to example embodiments.

FIG. 16 is a block diagram illustrating an example of a storage controller included in a storage device according to example embodiments.

Referring to FIG. 16, a storage controller 800 may include a processor 810, a memory 820, an error correction code (ECC) engine 830, a host interface (I/F) 840, an advanced encryption standard (AES) engine 850 and a memory interface 860.

The processor 810 may control an operation of the storage controller 800 in response to a request received via the host interface 840 from a host device (e.g., the host device 710 in FIG. 15). For example, the processor 810 may control an operation of a storage device (e.g., the storage device 720 in FIG. 15), and may control respective components of the storage device by employing firmware for operating the storage device. For example, the first sensitive data FWD in FIG. 1 may be data corresponding to the firmware.

The memory 820 may store instructions and data executed and processed by the processor 810. For example, the memory 820 may be implemented with a volatile memory, such as a DRAM, a SRAM, a cache memory, or the like.

The ECC engine 830 for error correction may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

The host interface 840 may provide physical connections between the host device and the storage device. The host interface 840 may provide an interface corresponding to a bus format of the host device for communication between the host device and the storage device. In some example embodiments, the bus format of the host device may be a small computer system interface (SCSI) or a serial attached SCSI (SAS) interface. In other example embodiments, the bus format of the host device may be a USB, a peripheral component interconnect (PCI) express (PCIe), an advanced technology attachment (ATA), a parallel ATA (PATA), a serial ATA (SATA), a nonvolatile memory (NVM) express (NVMe), a compute express link (CXL), etc., format.

The AES engine 850 may perform at least one of an encryption operation and a decryption operation on data input to the storage controller 800 by using a symmetric-key algorithm. The AES engine 850 may include an encryption module and a decryption module. For example, the encryption module and the decryption module may be implemented as separate modules. As another example, one module capable of performing both encryption and decryption operations may be implemented in the AES engine 850.

The memory interface 860 may exchange data with a nonvolatile memory (e.g., the nonvolatile memories 724a to 724c in FIG. 15). The memory interface 860 may transfer data to the nonvolatile memory, or may receive data read from the nonvolatile memory. For example, the memory interface 860 may be configured to comply with a standard protocol, such as Toggle or open NAND flash interface (ONFI).

Figure 17:
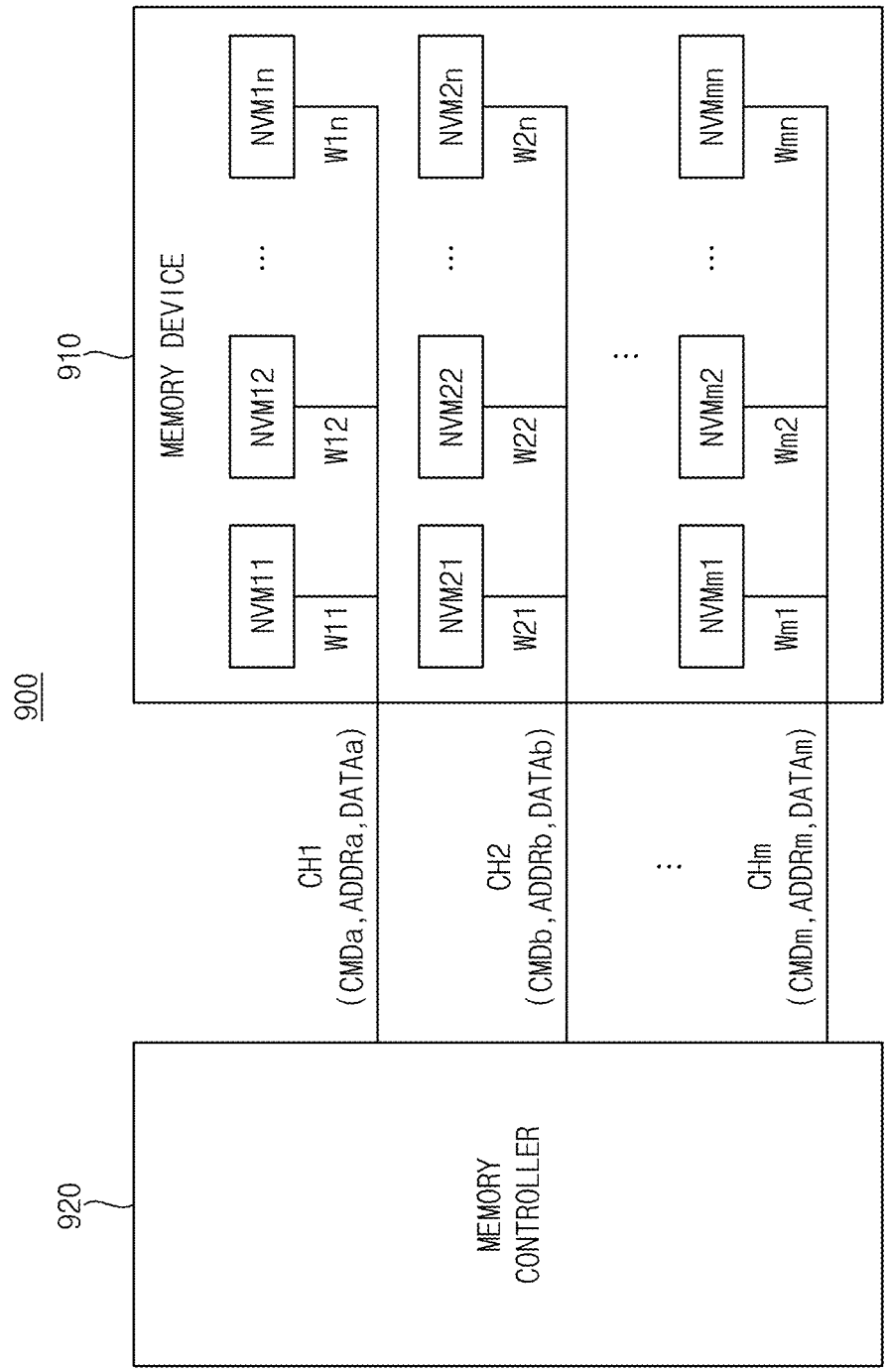
FIG. 17 is a block diagram illustrating a nonvolatile memory device and a memory system including the nonvolatile memory device according to example embodiments.

FIG. 17 is a block diagram illustrating a nonvolatile memory device and a memory system including the nonvolatile memory device according to example embodiments.

Referring to FIG. 17, a memory system 900 may include a memory device 910 and a memory controller 920. The memory system 900 may support a plurality of channels CH1 to CHm, where m is a natural number greater than two, and the memory device 910 may be connected to the memory controller 920 through the plurality of channels CH1 to CHm. For example, the memory system 900 may correspond to the storage device 720 in FIG. 15.

The memory device 910 may include a plurality of nonvolatile memories NVM11 to NVM1n, NVM21 to NVM2n, and NVMm1 to NVMmn, where n is a natural number greater than two. For example, the nonvolatile memories NVM11 to NVM1n, NVM21 to NVM2n, and NVMm1 to NVMmn may correspond to the nonvolatile memories 724a to 724c in FIG. 15. Each of the nonvolatile memories NVM11 to NVM1n, NVM21 to NVM2n, and NVMm1 to NVMmn may be connected to one of the plurality of channels CH1 to CHm through one of a plurality of ways W11 to W1n, W21 to W2n, and Wm1 to Wmn corresponding thereto.

The memory controller 920 may control overall operations of the memory device 910, and may transmit and receive signals to and from the memory device 910 through the plurality of channels CH1 to CHm. For example, the memory controller 920 may correspond to the storage controller 722 in FIG. 15. For example, the memory controller 920 may transmit commands CMDa to CMDm, addresses ADDRa to ADDRm and data DATAa, to DATAm to the memory device 910 through the channels CH1 to CHm or may receive the data DATAa to DATAm from the memory device 910.

The memory controller 920 may select one of the nonvolatile memories NVM11 to NVM1n, NVM21 to NVM2n, and NVMm1 to NVMmn, which is connected to each of the channels CH1 to CHm, by using a corresponding one of the channels CH1 to CHm, and may transmit and receive signals to and from the selected nonvolatile memory. The memory controller 920 may transmit and receive signals to and from the memory device 910 in parallel through different channels.

FIGS. 18, 19, 20, 21, 22, 23 and 24 are diagrams for describing an operation of a storage device according to example embodiments.

Referring to FIGS. 18, 19, 20 and 21, examples where each nonvolatile memory device includes four memory planes and a storage device includes two channels are illustrated.

In an example of FIG. 18, a first nonvolatile memory device CHP00 may be connected to a storage controller through a first channel CH0 and a first way W00, may include four memory planes PL00, PL01, PL02 and PL03. In a firmware super block FWSB of the first nonvolatile memory device CHP00, firmware data FWD may be stored in blocks FB00 and FB01, and BIST data mBTD00 may be stored in blocks FB02 and FB03, as described with reference to FIG. 4. For convenience of illustration, only the firmware data FWD is illustrated in FIG. 18, the firmware data FWD may be stored in the block FB00 and the replicated firmware data FWD_R may be stored in the block FB01, as described with reference to FIG. 4. A second nonvolatile memory device CHP10 may be connected to the storage controller through a second channel CH1 and a second way W10, and may include four memory planes PL10, PL11, PL12 and PL13. In a firmware super block FWSB of the second nonvolatile memory device CHP10, firmware data FWD may be stored in blocks FB10 and FB11, and BIST data mBTD10 may be stored in blocks FB12 and FB13.

In an example of FIG. 19, configurations of the first and second nonvolatile memory devices CHP00 and CHP10 may be the same as those described with reference to FIG. 18, except that the firmware data FWD for the second nonvolatile memory devices CHP10 is not stored in the blocks FB10 and FB11 in the firmware super block FWSB of the second nonvolatile memory device CHP10. As described above, the storage location of the firmware data FWD may be predefined in the specification of the storage device. For example, the storage location of the firmware data FWD may be defined as 0x0 and 0x1 of CH0 and WAY0 (e.g., W00) in the UFS device, and thus the storage of the firmware data FWD in the second nonvolatile memory device CHP10 may be omitted.

In examples of FIGS. 20 and 21, configurations of the first and second nonvolatile memory devices CHP00 and CHP10 may be the same as those described with reference to FIGS. 18 and 19. A third nonvolatile memory device CHP01 may be connected to the storage controller through the first channel CH0 and a way W01 different from the first way W00, and may include four memory planes PL00', PL01', PL02' and PL03'. In a firmware super block FWSB of the third nonvolatile memory device CHP01, the firmware data FWD may not be stored in blocks FB00' and FB01', and BIST data mBTD01 may be stored in blocks FB02' and FB03'. A fourth nonvolatile memory device CHP11 may be connected to the storage controller through the second channel CH1 and a way W11 different from the second way W10, and may include four memory planes PL10', PL11', PL12', PL13'. In a firmware super block FWSB of the fourth nonvolatile memory device CHP11, the firmware data FWD may not be stored in blocks FB10' and FB11', and BIST data mBTD11 may be stored in blocks FB12' and FB13'. Referring to FIG. 21, the firmware data FWD may not be stored in nonvolatile memory devices connected to ways other than WAY0.

Referring to FIGS. 22, 23 and 24, examples where each nonvolatile memory device includes four memory planes and a storage device includes four channels are illustrated.

In examples of FIGS. 22, 23 and 24, configurations of the first and second nonvolatile memory devices CHP00 and CHP10 may be the same as those described with reference to FIG. 18. A third nonvolatile memory device CHP20 may be connected to the storage controller through a third channel CH2 and a third way W20, and may include four memory planes PL20, PL21, PL22 and PL23. In a firmware super block FWSB of the third nonvolatile memory device CHP20, the firmware data FWD may be or may not be stored in blocks FB20 and FB21 according to example embodiments, and BIST data mBTD20 may be stored in blocks FB22 and FB23. A fourth nonvolatile memory device CHP30 may be connected to the storage controller through a fourth channel CH3 and a fourth way W30, and may include four memory planes PL30, PL31, PL32 and PL33. In a firmware super block FWSB of the fourth nonvolatile memory device CHP30, the firmware data FWD may be or may not be stored in blocks FB30 and FB31 according to example embodiments, and BIST data mBTD30 may be stored in blocks FB32 and FB33.

Although example embodiments are described based on that a specific number of channels, a specific number of ways and a specific number of memory planes, example embodiments of the invention are not limited thereto, and example embodiments be applied or employed to various examples including an arbitrary number of channels, an arbitrary number of ways and an arbitrary number of memory planes.

Figure 25:
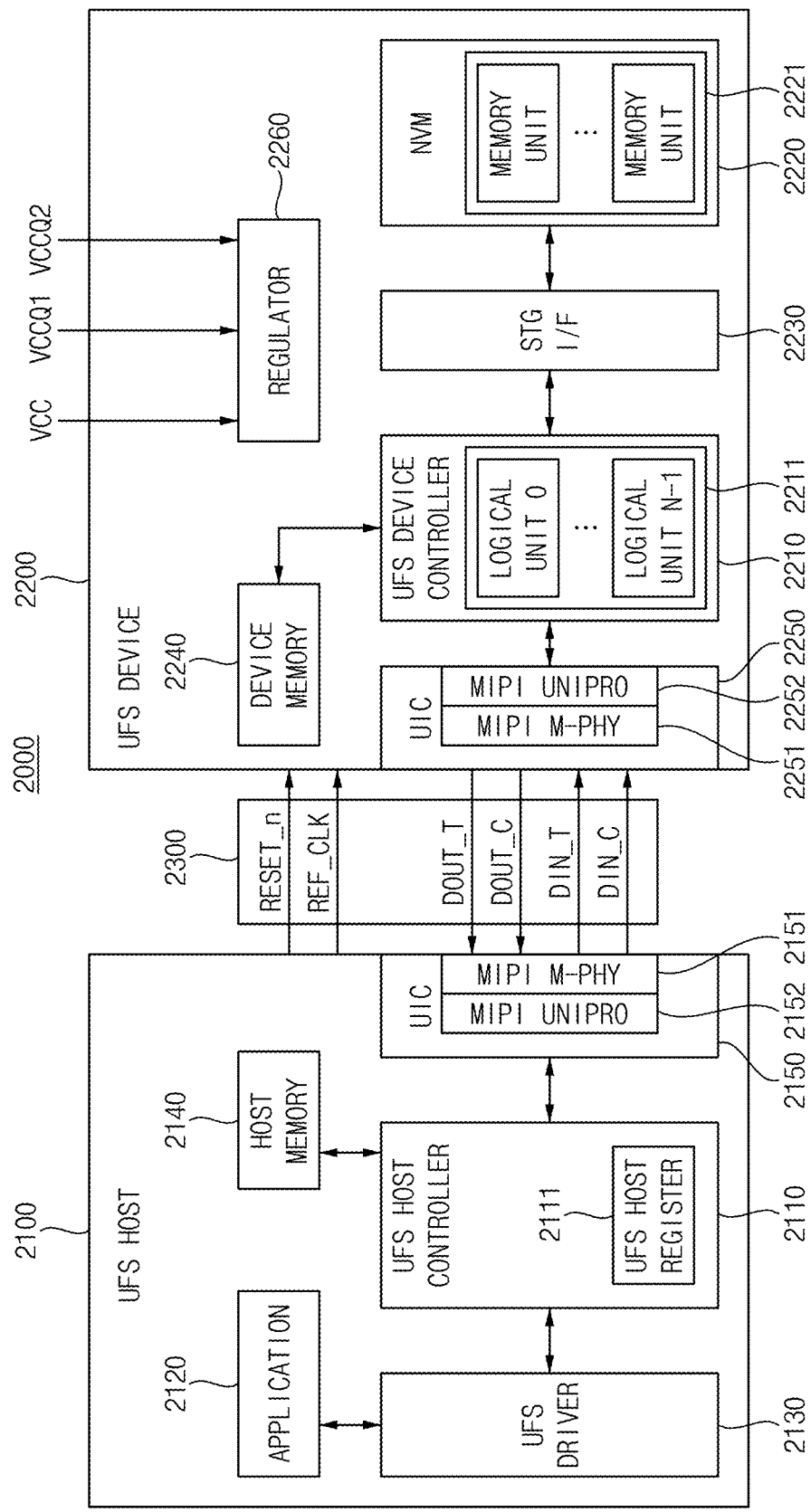
FIG. 25 is a block diagram illustrating a universal flash storage (UFS) device and a UFS system including the UFS device according to example embodiments.

FIG. 25 is a block diagram illustrating a universal flash storage (UFS) device and a UFS system including the UFS device according to example embodiments.

Referring to FIG. 25, a UFS system 2000 may be a system conforming to a UFS standard announced by joint electron device engineering council (JEDEC), and may include a UFS host 2100, a UFS device 2200 and a UFS interface 2300. The UFS host 2100 may be connected to the UFS device 2200 through the UFS interface 2300.

The UFS host 2100 may include a UFS host controller 2110, an application 2120, a UFS driver 2130, a host memory 2140, and a UFS interconnect (UIC) layer 2150. The UFS device 2200 may include a UFS device controller 2210, a nonvolatile memory 2220, a storage interface 2230, a device memory 2240, a UIC layer 2250, and a regulator 2260. The nonvolatile memory 2220 may include a plurality of memory units 2221. Although each of the memory units 2221 may include a V-NAND flash memory having a 2D structure or a 3D structure, each of the memory units 2221 may include another kind of nonvolatile memory, such as PRAM and/or RRAM. The UFS device controller 2210 may be connected to the nonvolatile memory 2220 through the storage interface 2230. The storage interface 2230 may be configured to comply with a standard protocol, such as Toggle or ONFI.

In some example embodiments, the UFS host 2100, the UFS host controller 2110, and the host memory 2140 may correspond to the host device 710, the host processor 712, and the host memory 714 in FIG. 15, respectively. The UFS device 2200, the UFS device controller 2210, the nonvolatile memory 2220, and the device memory 2240 may correspond to the storage device 720, the storage controller 722, the nonvolatile memories 724a to 724c, and the buffer memory 726 in FIG. 15, respectively.

The application 2120 may refer to a program that wants to communicate with the UFS device 2200 to use functions of the UFS device 2200. The application 2120 may transmit I/O requests to the UFS driver 2130 for I/O operations on the UFS device 2200. For example, the I/O requests may refer to a data read request, a data storage (or write) request, and/or a data erase (or discard) request. However, example embodiments of the invention are not limited thereto.

The UFS driver 2130 may manage the UFS host controller 2110 through a UFS-host controller interface (UFS-HCI). The UFS driver 2130 may convert the I/O requests generated by the application 2120 into a UFS command defined by the UFS standard, and mat transmit the UFS command to the UFS host controller 2110. For example, one I/O request may be converted into a plurality of UFS commands. For example, although the UFS command may basically be defined by an SCSI standard, the UFS command may be a command dedicated to the UFS standard.

The UFS host controller 2110 may transmit the UFS command converted by the UFS driver 2130 to the UIC layer 2250 of the UFS device 2200 through the UIC layer 2150 and the UFS interface 2300. For example, during the transmission of the UFS command, a UFS host register 2111 of the UFS host controller 2110 may serve as a command queue.

The UIC layer 2150 on the side of the UFS host 2100 may include a mobile industry processor interface (MIPI) M-PHY 2151 and a MIPI UniPro 2152. Similarly, the UIC layer 2250 on the side of the UFS device 2200 may also include a MIPI M-PHY 2251 and a MIPI UniPro 2252.

The UFS interface 2300 may include a line configured to transmit a reference clock signal REF_CLK, a line configured to transmit a hardware reset signal RESET n for the UFS device 2200, a pair of lines configured to transmit a pair of differential input signals DIN_T and DIN_C, and a pair of lines configured to transmit a pair of differential output signals DOUT_T and DOUT_C.

In some example embodiments, a frequency of a reference clock signal REF_CLK provided from the UFS host 2100 to the UFS device 2200 may be one of about 19.2 MHz, about 26 MHz, about 38.4 MHz, and about 52 MHz. However, example embodiments of the invention are not limited thereto. The UFS host 2100 may change the frequency of the reference clock signal REF_CLK during an operation, that is, during data transmission/receiving operations between the UFS host 2100 and the UFS device 2200. The UFS device 2200 may generate cock signals having various frequencies from the reference clock signal REF_CLK provided from the UFS host 2100, by using a phase-locked loop (PLL). Also, the UFS host 2100 may set a data rate between the UFS host 2100 and the UFS device 2200 by using the frequency of the reference clock signal REF_CLK. That is, the data rate may be determined depending on the frequency of the reference clock signal REF_CLK.

The UFS interface 2300 may support a plurality of lanes, each of which may be implemented as a pair of differential lines. For example, the UFS interface 2300 may include at least one receiving lane and at least one transmission lane. In FIG. 25, a pair of lines configured to transmit a pair of differential input signals DIN_T and DIN_C may constitute a receiving lane, and a pair of lines configured to transmit a pair of differential output signals DOUT_T and DOUT_C may constitute a transmission lane. Although one transmission lane and one receiving lane are illustrated in FIG. 25, the number of transmission lanes and the number of receiving lanes may be changed.

The receiving lane and the transmission lane may transmit data based on a serial communication scheme. Full-duplex communications between the UFS host 2100 and the UFS device 2200 may be enabled due to a structure in which the receiving lane is separated from the transmission lane. That is, while receiving data from the UFS host 2100 through the receiving lane, the UFS device 2200 may transmit data to the UFS host 2100 through the transmission lane. In addition, control data (e.g., a command) from the UFS host 2100 to the UFS device 2200 and user data to be stored in or read from the nonvolatile memory 2220 of the UFS device 2200 by the UFS host 2100 may be transmitted through the same lane. Accordingly, between the UFS host 2100 and the UFS device 2200, there may be no need to further provide a separate lane for data transmission in addition to a pair of receiving lanes and a pair of transmission lanes.

The UFS device controller 2210 of the UFS device 2200 may control all operations of the UFS device 2200. The UFS device controller 2210 may manage the nonvolatile memory 2220 by using a logical unit (LU) 2211, which is a logical data storage unit. For example, the number of LUs 2211 may be eight, however, example embodiments of the invention are not limited thereto. The UFS device controller 2210 may include a flash translation layer (FTL), and may convert a logical data address (e.g., a logical block address (LBA)) received from the UFS host 2100 into a physical data address (e.g., a physical block address (PBA)) by using address mapping information of the FTL. A logical block configured to store user data in the UFS system 2000 may have a size in a predetermined range. For example, a minimum size of the logical block may be set to 4K bytes.

When a command from the UFS host 2100 is applied through the UIC layer 2250 to the UFS device 2200, the UFS device controller 2210 may perform an operation in response to the command and transmit a completion response to the UFS host 2100 when the operation is completed.

In some example embodiments, when the UFS host 2100 intends to store user data in the UFS device 2200, the UFS host 2100 may transmit a data storage command to the UFS device 2200. When a response (e.g., a 'ready-to-transfer' response) indicating that the UFS host 2100 is ready to receive user data (ready-to-transfer) is received from the UFS device 2200, the UFS host 2100 may transmit user data to the UFS device 2200. The UFS device controller 2210 may temporarily store the received user data in the device memory 2240 and store the user data, which is temporarily stored in the device memory 2240, at a selected position of the nonvolatile memory 2220 based on the address mapping information of the FTL.

In some example embodiments, when the UFS host 2100 intends to read the user data stored in the UFS device 2200, the UFS host 2100 may transmit a data read command to the UFS device 2200. The UFS device controller 2210, which has received the command, may read the user data from the nonvolatile memory 2220 based on the data read command and temporarily store the read user data in the device memory 2240. For example, during the read operation, the UFS device controller 2210 may detect and correct an error in the read user data by using an ECC engine (e.g., the ECC engine 830 in FIG. 16) embedded therein.

In addition, the UFS device controller 2210 may transmit user data, which is temporarily stored in the device memory 2240, to the UFS host 2100. In addition, the UFS device controller 2210 may further include an AES engine (e.g., the AES engine 850 in FIG. 16).

The UFS host 2100 may sequentially store commands, which are to be transmitted to the UFS device 2200, in the UFS host register 2111, which may serve as a common queue, and sequentially transmit the commands to the UFS device 2200. In this case, even while a previously transmitted command is still being processed by the UFS device 2200, that is, even before receiving a notification that the previously transmitted command has been processed by the UFS device 2200, the UFS host 2100 may transmit a next command, which is on standby in the command queue, to the UFS device 2200. Thus, the UFS device 2200 may also receive a next command from the UFS host 2100 during the processing of the previously transmitted command. A maximum number (or queue depth) of commands that may be stored in the command queue may be, for example, 32. Also, the command queue may be implemented as a circular queue in which a start and an end of a command line stored in a queue are indicated by a head pointer and a tail pointer.

Each of the plurality of memory units 2221 may include a memory cell array (e.g., the memory cell array 20 in FIG. 1) and a control circuit (e.g., the control circuit 30 in FIG. 1) configured to control an operation of the memory cell array.

Voltages VCC, VCCQ, and VCCQ2 may be applied as power supply voltages to the UFS device 2200. The voltage VCC may be a main power supply voltage for the UFS device 2200 and be in a range of about 2.4 V to about 3.6 V. The voltage VCCQ may be a power supply voltage for supplying a low voltage mainly to the UFS device controller 2210 and be in a range of about 1.14 V to about 1.26 V. The voltage VCCQ2 may be a power supply voltage for supplying a voltage, which is lower than the voltage VCC and higher than the voltage VCCQ, mainly to an I/O interface, such as the MIPI M-PHY 2251, and be in a range of about 1.7 V to about 1.95 V. The power supply voltages may be supplied through the regulator 2260 to respective components of the UFS device 2200. The regulator 2260 may be implemented as a set of unit regulators respectively connected to different ones of the power supply voltages described above.

The example embodiments may be applied to various electronic devices and systems that include the nonvolatile memory devices and the storage devices. For example, the example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the present invention as set forth in the appended claims.

What is claimed is:

1. A nonvolatile memory device comprising:
   a memory cell array including a plurality of memory planes, each of the plurality of memory planes including memory blocks, each of the memory blocks including memory cells; and
   a control circuit configured to control an operation of the memory cell array in units of super blocks, the super blocks including memory blocks included in different memory planes,
   wherein a first memory block is included in a first super block of the super blocks and a first memory plane of the plurality of memory planes, and is configured to store first sensitive data that is required while the nonvolatile memory device is operating,
   wherein a second memory block is included in the first super block and a second memory plane of the plurality of memory planes different from the first memory plane, and is configured to store replicated data identical to the first sensitive data, and
   wherein a third memory block is included in the first super block and a third memory plane of the plurality of memory planes different from the first and second memory planes, and is configured to store second sensitive data that is required while the nonvolatile memory device is operating and is obtained during a first manufacturing process for the nonvolatile memory device.

2. The nonvolatile memory device of claim 1,
   wherein the number of the plurality of memory planes is four,
   wherein the third memory block is configured to store a first portion of the second sensitive data, and
   wherein a fourth memory block is included in the first super block and a fourth memory plane different from the first, second and third memory planes, and is configured to store a second portion of the second sensitive data.

3. The nonvolatile memory device of claim 1, wherein the first sensitive data is firmware data for driving a storage device including the nonvolatile memory device.

4. The nonvolatile memory device of claim 3, wherein a location of the first memory block in which the firmware data is stored is predefined.

5. The nonvolatile memory device of claim 4, wherein the location of the firmware data is predefined in a specification of the storage device, and
   wherein the third memory block is defined as an unused and empty area in the specification.

6. The nonvolatile memory device of claim 1,
   wherein the first manufacturing process is a packaging process that is performed while the nonvolatile memory device is manufacturing, and
   wherein the second sensitive data includes a result of a built-in self-test (BIST) operation that is performed in the packaging process.

7. The nonvolatile memory device of claim 6, wherein a program operation and an erase operation is performed on the third memory block such that the second sensitive data is updated.

8. The nonvolatile memory device of claim 1,
   wherein the number of the plurality of memory planes is six,
   wherein the third memory block is configured to store a first portion of the second sensitive data,
   wherein fourth, fifth and sixth memory blocks are included in the first super block and fourth, fifth and sixth memory planes different from the first, second and third memory planes, respectively, and
   wherein the fourth, fifth and sixth memory blocks are configured to store second, third and fourth portions of the second sensitive data, respectively.

9. The nonvolatile memory device of claim 1,
   wherein the number of the plurality of memory planes is eight,
   wherein the third memory block is configured to store a first portion of the second sensitive data, and
   wherein fourth, fifth, sixth, seventh and eighth memory blocks are included in the first super block and fourth, fifth, sixth, seventh and eighth memory planes different from the first, second and third memory planes, respectively, and
   wherein the fourth, fifth, sixth, seventh and eighth memory blocks are configured to store second, third, fourth, fifth and sixth portions of the second sensitive data, respectively.

10. The nonvolatile memory device of claim 1, wherein a fourth memory block that is different from the first, second and third memory blocks is configured to store third sensitive data that is obtained in a second manufacturing process for the nonvolatile memory device different from the first manufacturing process.

11. The nonvolatile memory device of claim 10,
    wherein the second manufacturing process is an electrical die sorting (EDS) process that is performed while the nonvolatile memory device is manufacturing, and
    wherein the third sensitive data includes a result of an EDS test operation that is performed in the EDS process.

12. The nonvolatile memory device of claim 11, wherein the fourth memory block is set as a one-time-programmable (OTP) block in which a program operation and an erase operations are not performed such that the third sensitive data is not updated.

13. A storage device comprising:
a plurality of nonvolatile memory devices; and
a storage controller configured to control an operation of the plurality of nonvolatile memory devices,
wherein a first nonvolatile memory device of the plurality of nonvolatile memory devices is connected to the storage controller through a first channel,
wherein the first nonvolatile memory device includes:
a first memory cell array including a plurality of first memory planes, each of the plurality of first memory planes including memory blocks each of which includes memory cells; and
a first control circuit configured to control an operation of the first memory cell array in units of super blocks, the super blocks including memory blocks included in different memory planes,
wherein a first-first memory block is included in a first super block of the super blocks and a first-first memory plane among the plurality of first memory planes, and is configured to store first sensitive data that is required while the storage device is operating,
wherein a first-second memory block is included in the first super block and a first-second memory plane different from the first-first memory plane among the plurality of first memory planes, and is configured to store replicated data identical to the first sensitive data, and
wherein a first-third memory block is included in the first super block and a first-third memory plane different from the first-first and first-second memory planes among the plurality of first memory planes, and is configured to store first-second sensitive data that is required while the first nonvolatile memory device is operating and is obtained during a first manufacturing process for the first nonvolatile memory device.

14. The storage device of claim 13,
wherein a second nonvolatile memory device of the plurality of nonvolatile memory devices is connected to the storage controller through a second channel different from the first channel,
wherein the second nonvolatile memory device includes:
a second memory cell array including a plurality of second memory planes, each of the plurality of second memory planes including memory blocks each of which includes memory cells; and
a second control circuit configured to control an operation of the second memory cell array in units of super blocks,
wherein a second-first memory block is included in a second super block of the super blocks corresponding to the first super block and a second-first memory plane among the plurality of second memory planes, and is configured to store the first sensitive data,
wherein a second-second memory block is included in the second super block and a second-second memory plane different from the second-first memory plane among the plurality of second memory planes, and is configured to store the replicated data, and
wherein a second-third memory block is included in the second super block and a second-third memory plane different from the second-first and second-second memory planes among the plurality of second memory planes, and is configured to store second-second sensitive data that is required while the second nonvolatile memory device is operating and is obtained during the first manufacturing process for the second nonvolatile memory device.

15. The storage device of claim 14,
wherein a third nonvolatile memory device is connected to the storage controller through a third channel different from the first and second channels,
wherein the third nonvolatile memory device includes:
a third memory cell array including a plurality of third memory planes, each of the plurality of third memory planes including memory blocks each of which includes memory cells; and
a third control circuit configured to control an operation of the third memory cell array in units of super blocks,
wherein a third-first memory block is included in a third super block of the super blocks corresponding to the first and second super blocks and a third-first memory plane among the plurality of third memory planes, and is configured to not store the first sensitive data,
wherein a third-second memory block is included in the third super block and a third-second memory plane different from the third-first memory plane among the plurality of third memory planes, and is configured to not store the replicated data, and
wherein a third-third memory block is included in the third super block and a third-third memory plane different from the third-first and third-second memory planes among the plurality of third memory planes, and is configured to store third-second sensitive data that is required while the third nonvolatile memory device is operating and is obtained during the first manufacturing process for the third nonvolatile memory device.

16. The storage device of claim 13,
wherein a second nonvolatile memory device of the plurality of nonvolatile memory devices different from the first nonvolatile memory device includes:
a second memory cell array including a plurality of second memory planes, each of the plurality of second memory planes including memory blocks each of which includes memory cells; and
a second control circuit configured to control an operation of the second memory cell array in units of super blocks,
wherein a second-first memory block is included in a second super block of the super blocks corresponding to the first super block and a second-first memory plane among the plurality of second memory planes, and is configured to not store the first sensitive data,
wherein a second-second memory block is included in the second super block and a second-second memory plane different from the second-first memory plane among the plurality of second memory planes, and is configured to not store the replicated data, and
wherein a second-third memory block is included in the second super block and a second-third memory plane different from the second-first and second-second memory planes among the plurality of second memory planes, and is configured to store second-second sensitive data that is required while the second nonvolatile memory device is operating and is obtained during the first manufacturing process for the second nonvolatile memory device.

17. The storage device of claim 16, wherein the second nonvolatile memory device is connected to the storage controller through a second channel different from the first channel.

18. The storage device of claim 16,
wherein the first nonvolatile memory device is connected to the storage controller through the first channel and a first way, and wherein the second nonvolatile memory device is connected to the storage controller through the first channel and a second way different from the first way.

19. The storage device of claim 13, wherein the storage device is a universal flash storage (UFS) device.

20. A universal flash storage (UFS) device comprising:
a UFS controller;
a first nonvolatile memory device connected to the UFS controller through a first channel, including first-first, first-second, first-third and first-fourth memory planes each of which including memory blocks, and configured to operate in units of super blocks, the super blocks including memory blocks included in different memory planes;
a second nonvolatile memory device connected to the UFS controller through a second channel, including second-first, second-second, second-third and second-fourth memory planes each of which including memory blocks, and configured to operate in units of super blocks;
a third nonvolatile memory device connected to the UFS controller through a third channel, including third-first, third-second, third-third and third-fourth memory planes each of which including memory blocks, and configured to operate in units of super blocks; and
a fourth nonvolatile memory device connected to the UFS controller through a fourth channel, including fourth-first, fourth-second, fourth-third and fourth-fourth memory planes each of which including memory blocks, and configured to operate in units of super blocks,
wherein first-first and first-second memory blocks are included in a first super block of the super blocks and the first-first and first-second memory planes, respectively, and are configured to store firmware data that is required while the UFS device is operating,
wherein first-third and first-fourth memory blocks are included in the first super block and the first-third and first-fourth memory planes, respectively, and are configured to store first result data of a built-in self-test (BIST) operation in a packaging process that is performed while the first nonvolatile memory device is manufacturing,
wherein second-first and second-second memory blocks are included in a second super block of the super blocks and the second-first and second-second memory planes, respectively, and are configured to store the firmware data,
wherein second-third and second-fourth memory blocks are included in the second super block and the second-third and second-fourth memory planes, respectively, and are configured to store second result data of the BIST operation in the packaging process that is performed while the second nonvolatile memory device is manufacturing,
wherein third-first and third-second memory blocks are included in a third super block of the super blocks and the third-first and third-second memory planes, respectively, and are configured to not store the firmware data,
wherein third-third and third-fourth memory blocks are included in the third super block and the third-third and third-fourth memory planes, respectively, and are configured to store third result data of the BIST operation in the packaging process that is performed while the third nonvolatile memory device is manufacturing,
wherein fourth-first and fourth-second memory blocks are included in a fourth super block of the super blocks and the fourth-first and fourth-second memory planes, respectively, and are configured to not store the firmware data, and
wherein fourth-third and fourth-fourth memory blocks are included in the fourth super block and the fourth-third and fourth-fourth memory planes, respectively, and are configured to store fourth result data of the BIST operation in the packaging process that is performed while the fourth nonvolatile memory device is manufacturing.

* * * * *